United States Patent
Ohlsson et al.

(10) Patent No.: US 12,262,438 B2
(45) Date of Patent: Mar. 25, 2025

(54) RRC CONNECTION ESTABLISHMENT, RE-ESTABLISHMENT, AND RESUMPTION IN A WIRELESS COMMUNICATION SYSTEM

(71) Applicant: Telefonaktiebolaget LM Ericsson (publ), Stockholm (SE)

(72) Inventors: Oscar Ohlsson, Bromma (SE); Gunnar Mildh, Sollentuna (SE); Malik Wahaj Arshad, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 5 days.

(21) Appl. No.: 18/461,582

(22) Filed: Sep. 6, 2023

(65) Prior Publication Data

US 2023/0413363 A1    Dec. 21, 2023

Related U.S. Application Data

(62) Division of application No. 17/056,788, filed as application No. PCT/SE2019/050464 on May 21, 2019, now abandoned.

(Continued)

(51) Int. Cl.
*H04W 76/19* (2018.01)
*H04W 12/03* (2021.01)
(Continued)

(52) U.S. Cl.
CPC ........... *H04W 76/19* (2018.02); *H04W 12/03* (2021.01); *H04W 12/10* (2013.01); *H04W 48/20* (2013.01); *H04W 76/27* (2018.02); *H04W 80/08* (2013.01)

(58) Field of Classification Search
CPC ..... H04W 76/19; H04W 76/27; H04W 76/10; H04W 36/0033; H04W 52/02;
(Continued)

(56) References Cited

U.S. PATENT DOCUMENTS

2016/0330612 A1  11/2016  Mildh et al.
2020/0281031 A1   9/2020  Wang et al.

FOREIGN PATENT DOCUMENTS

| CN | 102257852 A | 11/2011 |
| CN | 102469556 A |  5/2012 |
| CN | 103858512 A |  6/2014 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.1.0, Mar. 2018, 1-786.

(Continued)

*Primary Examiner* — Ian N Moore
*Assistant Examiner* — Brian T Le
(74) *Attorney, Agent, or Firm* — Murphy, Bilak & Homiller, PLLC

(57) ABSTRACT

A wireless device (14) transmits, to a radio network node (12), a radio resource control (RRC) connection request (18) that requests the establishment, re-establishment, or resumption of an RRC connection (16). The RRC connection request (18) indicates a type of core network to which the wireless device (14) selects to connect. The wireless device (14) in some embodiments receives a response to the RRC connection request (18), based on the type of core network to which the wireless device (14) selects to connect. For example, the wireless device (14) may receive the response using a protocol stack determined based on the type of core network to which the wireless device (14) selects to connect.

16 Claims, 24 Drawing Sheets

Related U.S. Application Data

(60) Provisional application No. 62/674,568, filed on May 21, 2018.

(51) Int. Cl.
  H04W 12/10 (2021.01)
  H04W 48/20 (2009.01)
  H04W 76/27 (2018.01)
  H04W 80/08 (2009.01)

(58) Field of Classification Search
  CPC ..... H04W 12/03; H04W 12/10; H04W 48/20; H04W 80/08; H04W 80/085; G06F 21/60; G06F 21/64; H04L 9/06; H04L 9/30; H04L 63/12
  See application file for complete search history.

(56) References Cited

OTHER PUBLICATIONS

3GPP, "3rd Generation Partnership Project; Technical Specification Group Radio Access Network; Evolved Universal Terrestrial Radio Access Network (E-UTRAN); Architecture description (Release 15)", 3GPP TS 36.401 V15.0.0, 3GPP, Dec. 2017, 1-21.

Ericsson, "Security for RRC Connection Suspend and Resume", 3GPP TSG-SA WG3 Meeting #83, S3-160588, revision of S3-16abcd, San Jose Del Cabo, Mexico, May 9-13, 2016, 1-3.

Ericsson, "Slicing for LTE connected to 5GC", 3GPP TSG-RAN WG2 #98, Tdoc R2-1707793, (revision of R2-1704174), Berlin, Germany, Aug. 21-25, 2017, 1-8.

Qualcomm Incorporated, "Type of PDCP Protocol Adoption for E-UTRAN connected to 5GCN", 3GPP TSG-RAN2 Meeting #99bis, R2-1710160, Prague, Czech Republic, Oct. 9-13, 2017, 1-4.

Unknown, Author, "PDCPversion change for SRBs", Ericsson, 3GPP TSG-RAN WG2 #100, R2-1713438, Reno, Nevada, Nov. 27-Dec. 1, 2017, 1-6.

RRC CONNECTION ESTABLISHMENT, RE-ESTABLISHMENT, AND RESUMPTION IN A WIRELESS COMMUNICATION SYSTEM

TECHNICAL FIELD

The present application relates generally to a wireless communication system and relates more particularly to a radio resource control (RRC) connection in such a system.

BACKGROUND

In order to re-establish or resume an RRC connection in a Long Term Evolution (LTE) radio access network (RAN), a wireless device transmits a request for such re-establishment or resumption to the RAN and the RAN responds with a message that includes RRC connection parameters. After the RRC connection has been re-established or resumed, the wireless device may communicate with the RAN using one of different possible protocol stacks, depending on the type of core network to which the wireless device selects to connect, e.g., an Evolved Packet Core (EPC) or a 5G Core (5GC). These protocol stacks differ, for example, in that they use different versions of the packet data convergence protocol (PDCP).

SUMMARY

Some embodiments herein enable determination of the type of core network to which the wireless device selects to connect, even during a procedure for establishing, re-establishing, or resuming an radio resource control (RRC) connection. One or more embodiments for instance indicate the type of core network to which the wireless device selects to connect in an RRC connection request that the wireless device transmits. These and other embodiments may thereby advantageously exploit a core network type specific protocol stack even for communicating during at least a portion of the RRC connection procedure, rather than delaying use of such a protocol stack until after the RRC connection procedure. This in turn means that, when the wireless device connects to a 5G Core for example, communication during at least a portion of the RRC connection procedure may already benefit from any security protocol enhancements in the 5G protocol stack, instead of those 5G enhancements being postponed until after the RRC connection procedure.

More particularly, embodiments herein include a method performed by a wireless device. The method includes transmitting, to a radio network node, a radio resource control, RRC, connection request that requests the establishment, re-establishment, or resumption of an RRC connection and that indicates a type of core network to which the wireless device selects to connect.

In some embodiments, the RRC connection request indicates the type of core network to which the wireless device selects to connect based on a type of the RRC connection request. In this case, different possible types of RRC connection requests indicate different possible types of core networks to which the wireless device selects to connect.

In some embodiments, the method further comprises selecting a type of core network to which to connect and generating the RRC connection request to indicate the selected type of core network.

In some embodiments, the method comprises transmitting the RRC connection request without integrity protection and/or confidentiality protection, and further comprises receiving a response to the RRC connection request that is integrity protected and/or confidentiality protected according to a security algorithm that depends on a type of core network indicated by the RRC connection request.

In some embodiments, the method comprises transmitting the RRC connection request on a first type of signaling bearer that uses a first protocol stack, and further comprises receiving a response to the RRC connection request on a second type of signaling bearer that uses different possible protocol stacks depending on a type of core network indicated by the RRC connection request. The different possible protocol stacks may for example have different versions of a packet data convergence protocol, PDCP.

In some embodiments, the method further comprises receiving a response to the RRC connection request based on the type of core network to which the wireless device selects to connect. In one or more embodiments, for example, receiving the response comprises determining, from different possible protocol stacks supported by the wireless device for receiving a response to the RRC connection request and based on the type of core network to which the wireless device selects to connect, a protocol stack to use for receiving the response to the RRC connection request. The response to the RRC connection request may then be received using the determined protocol stack.

Embodiments also include a method performed by a wireless device. The method comprises transmitting, to a radio network node, a radio resource control, RRC, connection request that requests the establishment, re-establishment, or resumption of an RRC connection; and receiving a response to the RRC connection request based on a type of core network to which the wireless device selects to connect.

Embodiments further include a method performed by a radio network node. The method comprises receiving, from a wireless device, a radio resource control, RRC, connection request that requests the establishment, re-establishment, or resumption of an RRC connection and that indicates a type of core network to which the wireless device selects to connect.

In some embodiments, the RRC connection request indicates the type of core network to which the wireless device selects to connect based on a type of the RRC connection request. In this case, different possible types of RRC connection requests indicate different possible types of core networks to which the wireless device selects to connect.

In some embodiments, the method comprises receiving the RRC connection request without integrity protection and/or confidentiality protection. In this case, the method may further comprise selecting, based on a type of core network indicated by the RRC connection request, a security algorithm to use to apply integrity protection and/or confidentiality protection to a response to the RRC connection request. The method may then include applying integrity protection and/or confidentiality protection to the response using the selected security algorithm, and transmitting the response as integrity protected and/or confidentiality protected.

In some embodiments, the method comprises receiving the RRC connection request on a first type of signaling bearer that uses a first protocol stack. In this case, the method may further comprise selecting, based on a type of core network indicated by the RRC connection request and from different possible protocol stacks supported by the radio network node, a protocol stack to use for a second type of signaling bearer on which to transmit a response to the RRC connection request. For example, the different possible protocol stacks may have different versions of a packet data convergence protocol, PDCP. Regardless, the method may then comprise transmitting the response to the RRC connection request on the second type of signaling bearer using the selected protocol stack.

In some embodiments, the method further comprises transmitting a response to the RRC connection request based on the type of core network to which the wireless device selects to connect. In one or more embodiments, for example, transmitting the response may comprise determining, from different possible protocol stacks supported by the radio network node for transmitting the response to the RRC connection request and based on the type of core network to which the wireless device selects to connect, a protocol stack to use for transmitting the response to the RRC connection request. The response to the RRC connection may then be transmitted using the determined protocol stack.

Embodiments also include a method performed by a radio network node. The method comprises receiving, from a wireless device, a radio resource control, RRC, connection request that requests the establishment, re-establishment, or resumption of an RRC connection; and transmitting a response to the RRC connection request based on a type of core network to which the wireless device selects to connect.

Embodiments moreover include a method performed by a radio network node. The method comprises receiving, from a wireless device, a radio resource control, RRC, connection request that requests the re-establishment or resumption of an RRC connection; responsive to the RRC connection request, attempting to retrieve a context for the wireless device for re-establishing or resuming the RRC connection; and determining, based on said attempting to retrieve the context for the wireless device, a type of core network to which the wireless device selects to connect.

In some embodiments, the method further comprises, before receiving the RRC connection request, releasing or suspending the RRC connection and storing core network type information in the context for the wireless device or in association with the context for the wireless device. This core network type information may indicate the type of core network to which the wireless device selected to connect for the RRC connection. In this case, determining the type of core network may comprise determining the type based on the core network type information stored in or in association with the retrieved context.

In some embodiments, the method further comprises, before receiving the RRC connection request, releasing or suspending the RRC connection and storing the context for the wireless device in one of multiple different possible storage locations respectively associated with different possible types of core networks selectable by the wireless device. In this case, attempting to retrieve the context may comprise attempting to retrieve the context from one or more of the multiple different possible storage locations and determining the type of core network may comprise determining said type based on from which possible storage location the context is successfully retrieved.

In some embodiments, attempting to retrieve the context may comprise attempting to retrieve the context for the wireless device over one or more of multiple different types of interfaces to another radio network node respectively associated with different types of core networks, and determining the type of core network may comprise determining said type based on over which type of interface the context is successfully retrieved.

In some embodiments, the method may further comprise retrieving multiple candidate contexts that are candidates for being the context for the wireless device, and determining which of the candidate contexts comprises the context for the wireless device based on which of the candidate contexts includes a security token that is verified by the radio network node.

In some embodiments, the method may further comprise transmitting a response to the RRC connection request based on the type of core network determined.

In some embodiments, the method may comprise receiving the RRC connection request without integrity protection and/or confidentiality protection. In one or more of these embodiments, the method may further comprise selecting, based on the type of core network determined, a security algorithm to use to apply integrity protection and/or confidentiality protection to a response to the RRC connection request. The method may then include applying integrity protection and/or confidentiality protection to the response using the selected security algorithm, and transmitting the response as integrity protected and/or confidentiality protected.

In some embodiments, the method may comprise receiving the RRC connection request on a first type of signaling bearer that uses a first protocol stack. In one or more of these embodiments, the method may further comprise selecting, based on the type of core network determined and from different possible protocol stacks supported by the radio network node, a protocol stack to use for a second type of signaling bearer on which to transmit a response to the RRC connection request, and transmitting the response to the RRC connection request on the second type of signaling bearer using the selected protocol stack. In one embodiment, for example, the different possible protocol stacks have different versions of a packet data convergence protocol, PDCP.

Embodiments also include corresponding apparatus, computer programs, and computer-readable storage mediums. For example, embodiments include a wireless device. The wireless device is configured (e.g., via communication circuitry and processing circuitry) to transmit, to a radio network node, a radio resource control, RRC, connection request that requests the establishment, re-establishment, or resumption of an RRC connection and that indicates a type of core network to which the wireless device selects to connect.

A wireless device according to other embodiments is configured (e.g., via communication circuitry and processing circuitry) to transmit, to a radio network node, a radio resource control, RRC, connection request that requests the establishment, re-establishment, or resumption of an RRC connection, and to receive a response to the RRC connection request based on a type of core network to which the wireless device selects to connect.

Still other embodiments include a radio network node. The radio network node is configured (e.g., via communication circuitry and processing circuitry) to receive, from a wireless device, a radio resource control, RRC, connection request that requests the establishment, re-establishment, or resumption of an RRC connection and that indicates a type of core network to which the wireless device selects to connect.

A radio network node according to other embodiments is configured (e.g., via communication circuitry and processing circuitry) to receive, from a wireless device, a radio resource control, RRC, connection request that requests the establishment, re-establishment, or resumption of an RRC connection, and to transmit a response to the RRC connection request based on a type of core network to which the wireless device selects to connect.

A radio network node according to yet other embodiments is configured (e.g., via communication circuitry and processing circuitry) to receive, from a wireless device, a radio resource control, RRC, connection request that requests the re-establishment or resumption of an RRC connection. Responsive to the RRC connection request, the radio network node is configured to attempt to retrieve a context for the wireless device for re-establishing or resuming the RRC connection. The radio network node is further configured to determine, based on said attempting to retrieve the context for the wireless device, a type of core network to which the wireless device selects to connect.

DETAILED DESCRIPTION

Figure 1:
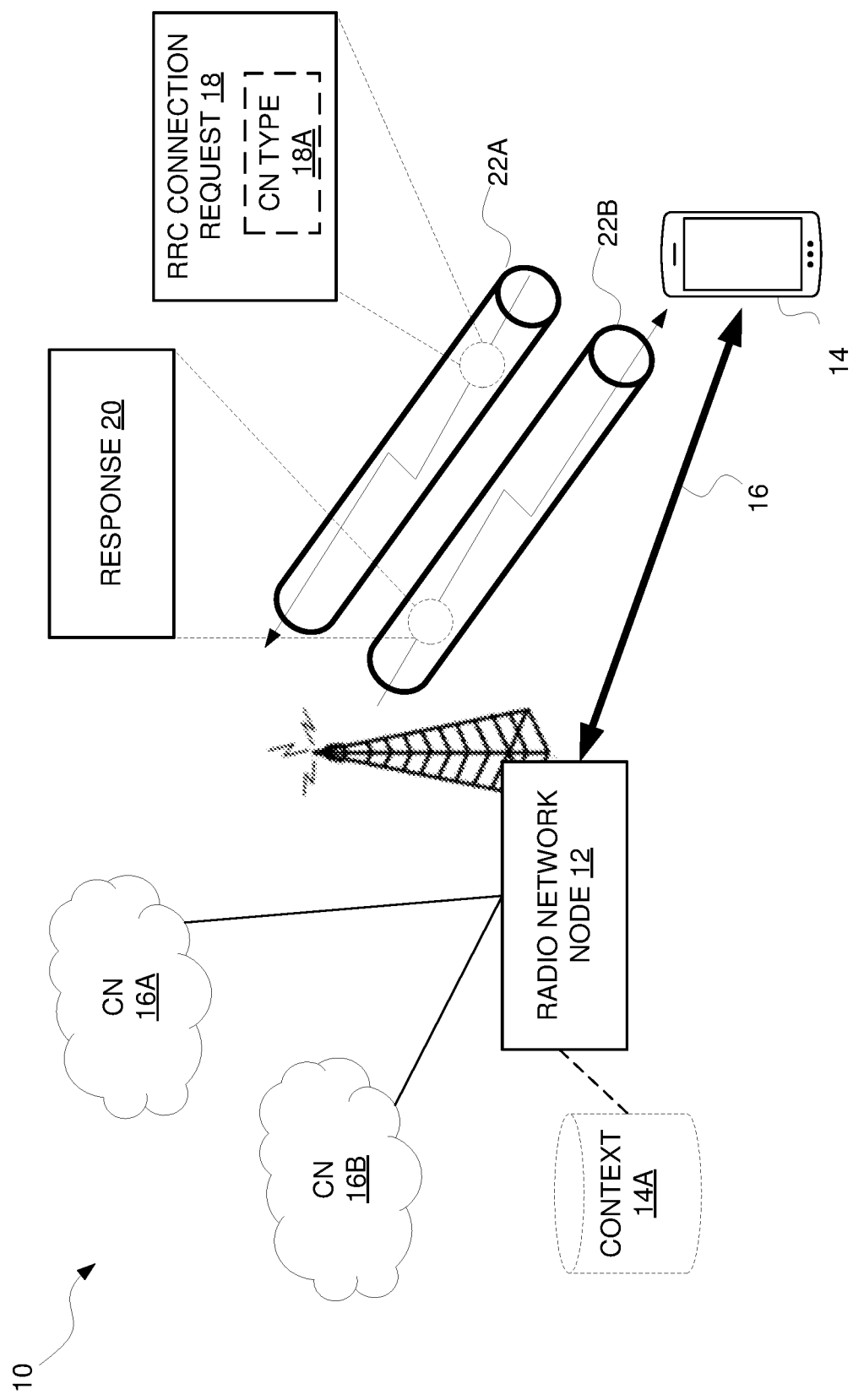
FIG. 1 is a block diagram of a wireless communication system according to some embodiments.

FIG. 1 shows a wireless communication system 10 according to some embodiments. The system 10 includes a radio network node 12 (e.g., a base station) in a radio access network portion of the system 10. The system 10 as shown also includes a wireless device 14 configured to wirelessly communicate with the radio network node 12, e.g., for connecting to a core network portion of the system 10. The radio network node 12 according to some embodiments, for example, supports connection with multiple different types of core networks (CNs), two of which are shown as CN 16A (e.g., an Evolved Packet Core, EPC) and CN 16B (e.g., 5G-CN, 5GC). In some embodiments, the wireless device 14 correspondingly supports connection with the different types of CNs 16A and 16B, such that the wireless device 14 is capable of selecting to connect to either type of CN 16A or 16B. This may distinguish the wireless device 14 from another type of wireless device that does not support connection with the different types of CNs 16A and 16B.

In this regard, the wireless device 14 is configured to request the establishment a radio resource control (RRC) connection 16 with the radio network node 12. The RRC connection 16 may be used for broadcast of system information, paging, transfer of non-access stratum (NAS) information, access stratum (AS) security configuration, transfer of device radio access capability, measurement configuration and reporting, and/or mobility control. The RRC connection 16 in this regard may be the highest layer in the control plane of the AS and may transfer messages of the NAS (located above the RRC layer). With an RRC connection 16 established, the radio network node 12 is able to allocate radio resources to the wireless device 14 and the device can correspondingly send or receive data.

Establishment of the RRC connection 16 may involve configuring radio bearers between the radio network node 12 and the wireless device 14, configuring an AS security context, etc. The radio network node 12 stores this and other information associated with the wireless device's RRC connection 16 as a so-called context 14A for the wireless device 14. The context 14A for the wireless device 14 may therefore contain information needed to establish and/or maintain the RRC connection 16, including for instance device state information, security information, device capability information, identities of the device-associated logical connection to the core network, and the like.

Release of the RRC connection 16 (e.g., after completion of data transfer) correspondingly releases the device's context 14A at the radio network node 12, e.g., such that the radio network node 12 no longer stores that context 14A. Then, if and when the wireless device 14 needs another RRC connection (e.g., for transfer of newly arrived data), the wireless device 14 must request re-establishment of an RRC connection.

In some embodiments, though, the radio network node 12 and wireless device 14 support suspension of the RRC connection 16 as an alternative to complete release of the RRC connection 16. When the RRC connection 16 is suspended, the radio network node 12 preserves the context 14A for the wireless device 14 rather than releasing it. This way, the wireless device 14 can request resumption of the RRC connection 16 (e.g., by providing the radio network node 12 with a Resume ID mapped to the context 14A) and thereby avoids AS security setup and RRC reconfiguration in each data transfer.

According to some embodiments, the wireless device 14 is configured to transmit an RRC connection request 18 to the radio network node 12. The RRC connection request 18 requests the establishment, re-establishment, or resumption of an RRC connection 16. The RRC connection request 18 may for instance be an RRC connection establishment request, an RRC connection re-establishment request, or an RRC connection resume request. In some embodiments, the request 18 may be referred to as MSG3 in a random access procedure. Regardless, the radio network node 12 is configured to transmit a response 20 to the RRC connection request 18. The response 20 may for instance include information (e.g., a device identity or a connection establishment cause) for establishing, re-establishing, or resuming the connection. Or, if the radio network node 12 rejects the request 18, the response 20 may be a reject message that informs the wireless device 14 that the request 18 was rejected. In some embodiments, the response 20 may be referred to as MSG4 in a random access procedure.

Figure 13B:
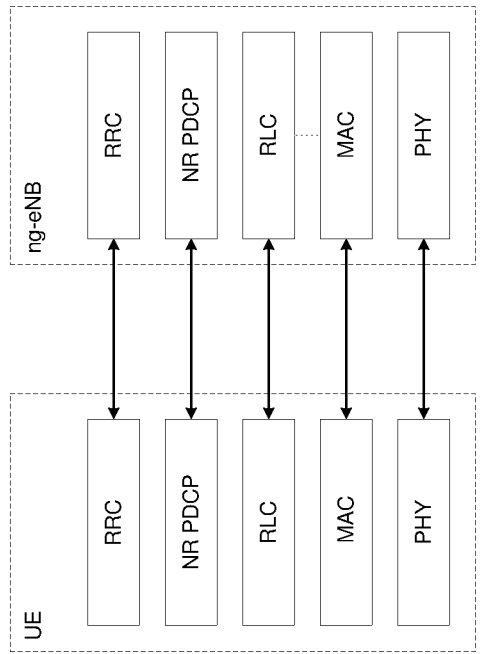
FIG. 13B is a block diagram of a protocol stack for an ng-eNB connected to the 5G Core (5GC) according to some embodiments.
Figure 13A:
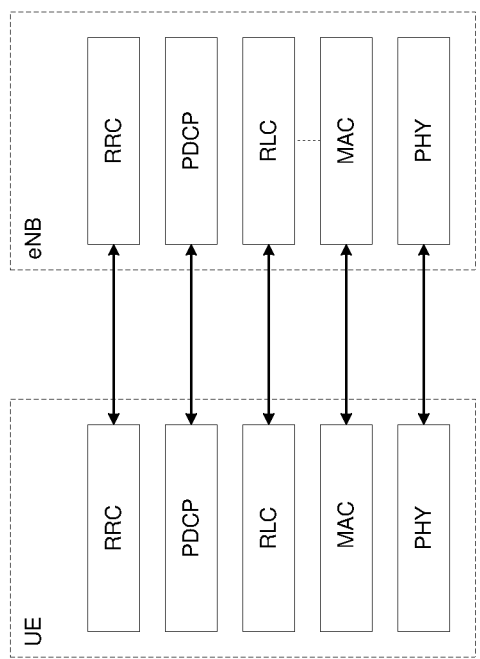
FIG. 13A is a block diagram of a protocol stack for an eNB connected to the Evolved Packet Core (EPC) according to some embodiments.

In some embodiments, the radio network node 12 transmits the response 20 based on a type of CN to which the wireless device 14 selects to connect. For example, in one or more embodiments, the radio network node 12 receives the RRC connection request 18 on a first type of signalling bearer 22A (e.g., SRB0) that uses a first protocol stack. And the radio network node 12 transmits the response 20 on a second type of signalling bearer 22B (e.g., SRB1) that uses different protocol stacks (e.g., as shown in FIGS. 13A and 13B) depending on a type of core network to which the wireless device 14 selects to connect. For instance, the different protocol stacks may have different versions of a packet data convergence protocol (PDCP) (e.g., LTE PDCP and NR-PDCP).

In this and other cases, then, the radio network node 12 may determine, from different possible protocol stacks supported by the radio network node 12 for transmitting the response 20 to the RRC connection request 18 and based on a type of core network to which the wireless device 14 selects to connect, a protocol stack to use for transmitting the response 20 to the RRC connection request 18. The radio network node 12 may then transmit the response 20 using the determined protocol stack.

Alternatively or additionally, in some embodiments, the radio network node 12 receives the RRC connection request 18 without integrity protection and/or confidentiality protection. And the radio network node 12 transmits the response 20 to the RRC connection request 18 with the response 20 being integrity protected and/or confidentiality protected according to a security algorithm that depends on a type of core network to which the wireless device 14 selects to connect. For example, in some embodiments, the different protocol stacks mentioned above may use different security algorithms (e.g., at the PDCP level). Regardless, then, the radio network node 12 may select, based on the type of core network to which the wireless device 14 selects to connect, the security algorithm to use to apply integrity protection and/or confidentiality protection to the response 20. The radio network node 12 may then apply integrity protection and/or confidentiality protection to the response 20 using the selected security algorithm, and transmit the response 20 as integrity protected and/or confidentiality protected.

Although not shown, the wireless device 14 in some embodiments may transmit another message, referred to as an acknowledgement message, that acknowledges the response 20 from the radio network node 12. Where the RRC connection request 18 requests the establishment of the RRC connection 16, for example, the wireless device 14 may receive the response 20 in the form of an RRC Connection Setup message and then transmit an RRC Connection Setup Complete message "(e.g., MSG5) which acknowledges the response 20. Regardless, in one or more embodiments, the wireless device 14 may transmit the acknowledgement message based on a type of CN to which the wireless device 14 selects to connect. For example, in one or more embodiments, the wireless device 14 transmits the RRC connection request 18 on the first type of signalling bearer 22A (e.g., SRB0) that uses a first protocol stack. And the wireless device 14 transmits the acknowledgement message on the second type of signalling bearer 22B (e.g., SRB1) that uses different protocol stacks (e.g., as shown in FIGS. 13A and 13B) depending on a type of core network to which the wireless device 14 selects to connect. For instance, the different protocol stacks may have different versions of a packet data convergence protocol (PDCP) (e.g., LTE PDCP and NR-PDCP).

In this and other cases, then, the wireless device 14 may determine, from different possible protocol stacks supported by the wireless device 14 for transmitting the acknowledgement message and based on a type of core network to which the wireless device 14 selects to connect, a protocol stack to use for transmitting the acknowledgement message. The wireless device 14 may then transmit the acknowledgement message using the determined protocol stack. Correspondingly, the radio network node 12 may determine, from different possible protocol stacks supported by the radio network node 12 for receiving the acknowledgement message and based on a type of core network to which the wireless device 14 selects to connect, a protocol stack to use for receiving the acknowledgement message.

Alternatively or additionally, in some embodiments, the wireless device 14 transmits the RRC connection request 18 without integrity protection and/or confidentiality protection. And the wireless device 14 transmits the acknowledgment message with the acknowledgment message being integrity protected and/or confidentiality protected according to a security algorithm that depends on a type of core network to which the wireless device 14 selects to connect. For example, in some embodiments, the different protocol stacks mentioned above may use different security algorithms (e.g., at the PDCP level). Regardless, then, the wireless device 14 may select, based on the type of core network to which the wireless device 14 selects to connect, the security algorithm to use to apply integrity protection and/or confidentiality protection to the acknowledgment message. The wireless device 14 may then apply integrity protection and/or confidentiality protection to the acknowledgment message using the selected security algorithm, and transmit the acknowledgment message as integrity protected and/or confidentiality protected.

Correspondingly, the radio network node 14 may receive the RRC connection request 18 without integrity protection and/or confidentiality protection. And the radio network node 14 receives the acknowledgment message with the acknowledgment message being integrity protected and/or confidentiality protected according to a security algorithm that depends on a type of core network to which the wireless device 14 selects to connect. For example, in some embodiments, the different protocol stacks mentioned above may use different security algorithms (e.g., at the PDCP level). Regardless, then, the radio network node 14 may select, based on the type of core network to which the wireless device 14 selects to connect, the security algorithm with which to receive the acknowledgment message. The radio network node 14 may then receive the acknowledgement message using the selected security algorithm.

In some embodiments, the wireless device 14 signals or otherwise indicates to the radio network node 12 the type of core network (e.g., 16A or 16B) to which the wireless device 14 selects to connect (i.e., the type of CN to which the wireless device 14 is connecting). The wireless device 14 may for instance indicate the type of core network in the RRC connection request 18. In other embodiments, the radio network node 12 deduces or otherwise determines the type of core network, e.g., based on the context 14A for the wireless device 14 or based on how the context 14A for the wireless device 14 is retrieved.

More particularly, the RRC connection request 18 in some embodiments indicates a type of core network (e.g., 16A or 16B) to which the wireless device 14 selects to connect. For example, in some embodiments as shown in FIG. 1, the RRC connection request 18 indicates the type of core network to which the wireless device 14 selects to connect by the presence or absence of a CN type field 18A in the RRC connection request 18. The presence of the field 18A in the RRC connection request 18 may indicate that the wireless device 14 selects to connect to a certain type of core network (e.g., 5GC).

In other embodiments, the RRC connection request 18 indicates the type of core network to which the wireless device 14 selects to connect based on a type of the RRC connection request 18. In this case, different possible types of RRC connection requests indicate different possible types of core networks to which the wireless device 14 selects to connect.

In still other embodiments, the RRC connection request 18 indicates the type of core network to which the wireless device 14 selects to connect using an identity for the wireless device 14 included in the RRC connection request 18. This may mean that different possible identities are assigned to wireless devices based on a type of core network to which the devices select to connect, e.g., based on active cooperation or coordination across different core network types, based on predefined identifier assignment rules, or the like.

In some embodiments, for example, where the RRC connection request 18 is an RRC connection re-establishment request that requests the re-establishment of an RRC connection 16, the identity for the wireless device 14 is a combination of a cell radio network temporary identifier (C-RNTI), a physical cell identity (PCI), and a security token. In other embodiments where the RRC connection request 18 is an RRC connection resume request that requests the resumption of an RRC connection 16, the identity for the wireless device 14 is a resume identifier or an inactive state RNTI (I-RNTI) that identifies a wireless device context 14A in an RRC inactive state.

No matter the particular nature of the identity for the wireless device 14, though, the identity in some embodiments includes a bit or bit pattern that indicates the type of core network to which the wireless device 14 selects to connect. For example, in one embodiment where the device identifier includes a C-RNTI, the first bit of the C-RNTI may be set to 0 to identify a wireless device that selects to connect to an EPC type of CN, but may be set to 1 to identify a wireless device that selects to connect to a 5GC type of CN. In other embodiments where the device identifier is a resume ID or an I-RNTI, the last bit of the identifier may be set to 0 to identify a wireless device that selects to connect to an EPC type of CN but may be set to 1 to identify a wireless device that selects to connect to a 5GC type of CN.

In other embodiments where the radio network node 12 deduces or otherwise determines the type of core network, the radio network node 12 may determine the type of core network based on its attempt to retrieve the context 14A for the wireless device 14, e.g., for re-establishing or resuming the RRC connection 16. In one embodiment, for example, the radio network node 14 stores core network type information in the context 14A for the wireless device 14 or in association with the context 14A, e.g., when establishing the RRC connection 16 initially but prior to release or suspension of that connection 16. The core network type information indicates the type of core network to which the wireless device 14 selected to connect for the RRC connection 16. This way, the radio network node 12 may determine the type based on the core network type information stored in or in association with the retrieved context 14A.

In still other embodiments, the radio network node 12 determines the type of core network based on a location from which the context 14A is retrieved and/or based on an interface over which the context 14A is retrieved. For example, in some embodiments, before receiving the RRC connection request 18, the radio network node 12 releases or suspends the RRC connection 16 and stores the context 14A for the wireless device 14 in one of multiple different possible storage locations respectively associated with different possible types of core networks selectable by the wireless device 14. Later, when the wireless device 14 requests to re-establish or resume the RRC connection, the radio network node 12 attempts to retrieve the context 14A from one or more of the multiple different possible storage locations, the radio network node 12 determines the type of core network based on from which possible storage location the context 14A is successfully retrieved.

Alternatively, the radio network node 12 may attempt to retrieve the context 14A for the wireless device over one or more of multiple different types of interfaces to another radio network node (e.g., a source radio network node of a handover) respectively associated with different types of core networks. In this case, the radio network node 12 may determine the type of core network based on over which type of interface the context 14A is successfully retrieved.

In either case, if multiple candidate contexts are retrieved as candidates for being the context 14A for the wireless device 14 (e.g., which may happen if there is an identifier conflict or overlap), the radio network node 12 may determine which of the candidate contexts is the context 14A for the wireless device 14 based on which of the candidate contexts includes a security token (e.g., short I-MAC) that is verified by the radio network node 12.

Embodiments described above with respect to a type of core network to which the wireless device 14 selects to connect may also be described with respect to a type of the wireless device 14. For example, different types of wireless devices may be capable of connecting to different types of core networks. Accordingly, in some embodiments, the radio network node 12 transmits the response 20 based on a type of the wireless device 14, e.g., as indicated by the RRC connection request 18 and/or as determined from a context 14A for the wireless device. Still other embodiments may be described with respect to a PDCP version supported by the wireless device 14.

Figure 2:
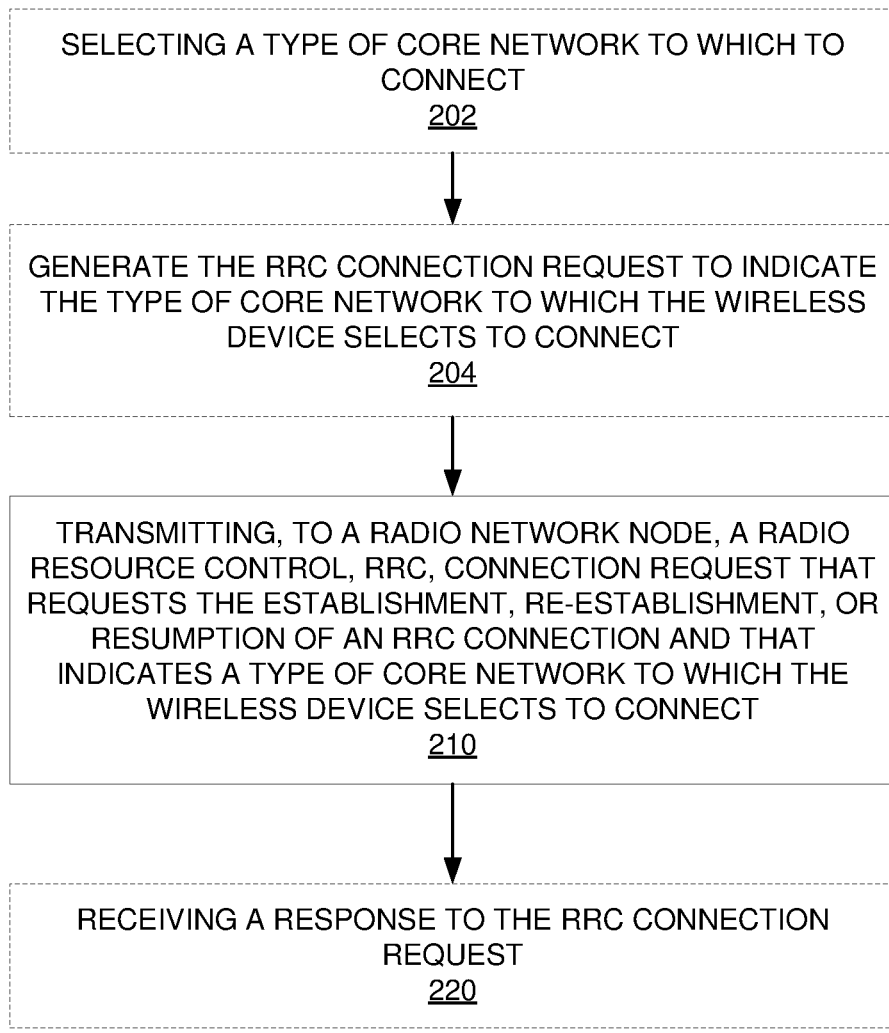
FIG. 2 is a logic flow diagram of a method performed by a wireless device according to some embodiments.

In view of the above modifications and variations, FIG. 2 depicts a method performed by a wireless device 14 in accordance with particular embodiments. The method includes transmitting, to a radio network node 12, a radio resource control, RRC, connection request 18 that requests the establishment, re-establishment, or resumption of an RRC connection 16 and that indicates a type of core network to which the wireless device 14 selects to connect (Block 210). In some embodiments, the method also comprises selecting a type of core network to which to connect (Block 202) and generating the RRC connection request 18 to indicate the type of core network to which the wireless device 14 selects to connect (Block 204). Alternatively or additionally, the method may include receiving a response 20 to the RRC connection request 18, e.g., based on the type of core network indicated by the RRC connection request 18 (Block 220).

In some embodiments, the RRC connection request 18 indicates the type of core network to which the wireless device 14 selects to connect by the presence or absence of a field in the RRC connection request 18. For example, wherein the presence of the field in the RRC connection request 18 may indicate that the wireless device 14 selects to connect to a certain type of core network.

In some embodiments, the RRC connection request 18 indicates the type of core network to which the wireless device 14 selects to connect based on a type of the RRC connection request 18. For example, different possible types of RRC connection requests indicate different possible types of core networks to which the wireless device 14 selects to connect.

In some embodiments, the RRC connection request 18 indicates the type of core network to which the wireless device 14 selects to connect using an identity for the wireless device 14 included in the RRC connection request 18. For example, where the RRC connection request 18 is an RRC connection re-establishment request that requests the re-establishment of an RRC connection 16, the identity for the wireless device 14 may be a combination of a cell radio network temporary identifier, C-RNTI, a physical cell identity, PCI, and a security token. Or, where the RRC connection request 18 is an RRC connection resume request that requests the resumption of an RRC connection 16, the identity for the wireless device 14 may be a resume identifier or an inactive state RNTI, I-RNTI, that identifies a wireless device context in an RRC inactive state.

In either case, the identity for the wireless device 14 may include a bit or bit pattern that indicates the type of core network to which the wireless device 14 selects to connect.

In some embodiments, the method further comprises selecting a type of core network to which to connect and generating the RRC connection request 18 to indicate the selected type of core network.

In some embodiments, the method comprises transmitting the RRC connection request 18 without integrity protection and/or confidentiality protection. In this case, the method may further comprise receiving a response 20 to the RRC connection request 18 that is integrity protected and/or confidentiality protected according to a security algorithm that depends on a type of core network indicated by the RRC connection request 18.

In some embodiments, the method comprises transmitting the RRC connection request 18 on a first type of signaling bearer that uses a first protocol stack, and further comprises receiving a response 20 to the RRC connection request 18 on a second type of signaling bearer that uses different possible protocol stacks depending on a type of core network indicated by the RRC connection request 18. For example, the different possible protocol stacks may have different versions of a packet data convergence protocol, PDCP.

Figure 3:
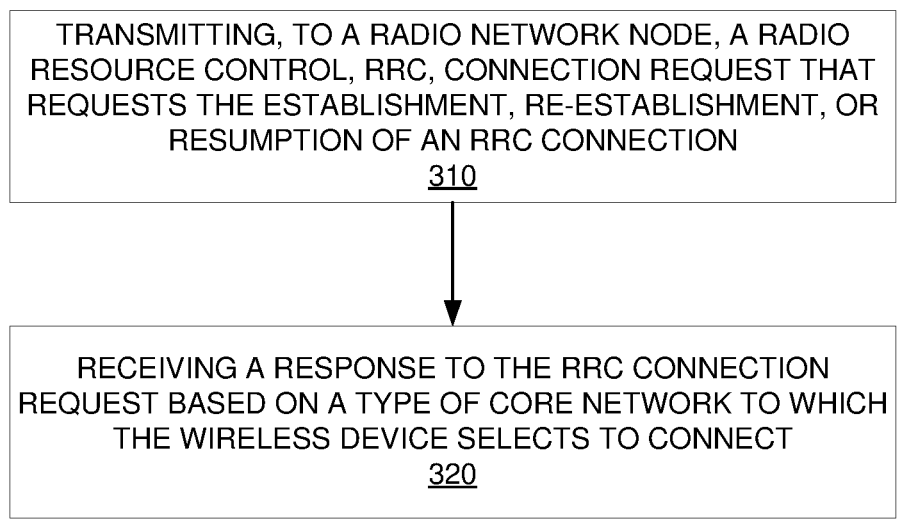
FIG. 3 is a logic flow diagram of a method performed by a wireless device according to other embodiments.

FIG. 3 depicts a method performed by a wireless device 14 in accordance with other embodiments. The method includes transmitting, to a radio network node 12, a radio resource control, RRC, connection request 18 that requests the establishment, re-establishment, or resumption of an RRC connection 16 (Block 310). The method also includes receiving a response 20 to the RRC connection request 18 based on a type of core network to which the wireless device 14 selects to connect (Block 320).

In some embodiments, for example, such receiving comprises determining, from different possible protocol stacks supported by the wireless device 14 for receiving a response 20 to the RRC connection request 18 and based on the type of core network to which the wireless device 14 selects to connect, a protocol stack to use for receiving the response 20 to the RRC connection request 18. The method may then comprise receiving the response 20 to the RRC connection request 18 using the determined protocol stack.

Alternatively or additionally, the method comprises transmitting the RRC connection request 18 without integrity protection and/or confidentiality protection; and receiving the response 20 to the RRC connection request 18 with the response being integrity protected and/or confidentiality protected according to a security algorithm that depends on a type of core network to which the wireless device 14 selects to connect.

Alternatively or additionally, the method comprises transmitting the RRC connection request 18 on a first type of signaling bearer 22A that uses a first protocol stack, and receiving the response 20 to the RRC connection request 18 on a second type of signaling bearer 22B that uses the different possible protocol stacks depending on a type of core network to which the wireless device 14 selects to connect. In one embodiment, for example, the different possible protocol stacks have different versions of a packet data convergence protocol, PDCP.

Figure 4:
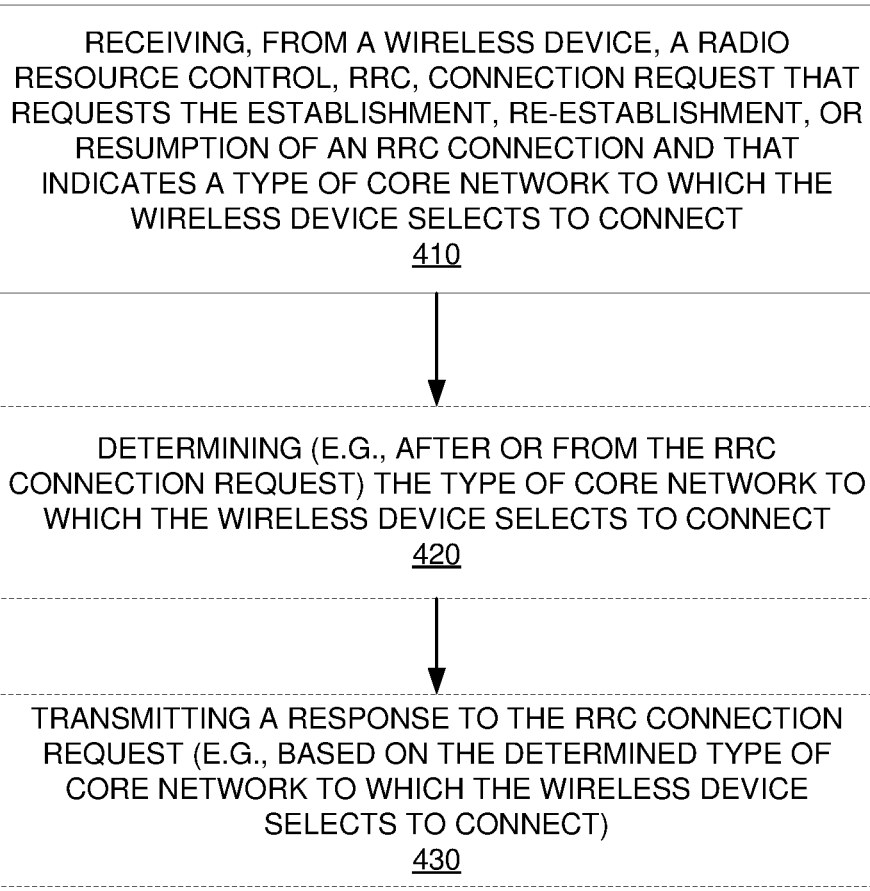
FIG. 4 is a logic flow diagram of a method performed by a radio network node according to some embodiments.

FIG. 4 depicts a method performed by a radio network node 12 (e.g., a base station) in accordance with other particular embodiments. The method includes receiving, from a wireless device 14, a radio resource control, RRC, connection request 18 that requests the establishment, re-establishment, or resumption of an RRC connection 16 and that indicates a type of core network to which the wireless device 14 selects to connect (Block 410). The method in some embodiments may also comprise determining (e.g., after or from the RRC connection request 18) the type of core network to which the wireless device 14 selects to connect (Block 420). Alternatively or additionally, the method may comprise transmitting a response 20 to the RRC connection request 18, e.g., based on the determined type of core network to which the wireless device 14 selects to connect (Block 430).

In some embodiments, the RRC connection request 18 indicates the type of core network to which the wireless device 14 selects to connect by the presence or absence of a field in the RRC connection request 18. For example, wherein the presence of the field in the RRC connection request 18 may indicate that the wireless device 14 selects to connect to a certain type of core network.

In some embodiments, the RRC connection request 18 indicates the type of core network to which the wireless device 14 selects to connect based on a type of the RRC connection request 18. For example, different possible types of RRC connection requests indicate different possible types of core networks to which the wireless device 14 selects to connect.

In some embodiments, the RRC connection request 18 indicates the type of core network to which the wireless device 14 selects to connect using an identity for the wireless device 14 included in the RRC connection request 18. For example, where the RRC connection request 18 is an RRC connection re-establishment request that requests the re-establishment of an RRC connection 16, the identity for the wireless device 14 may be a combination of a cell radio network temporary identifier, C-RNTI, a physical cell identity, PCI, and a security token. Or, where the RRC connection request 18 is an RRC connection resume request that requests the resumption of an RRC connection 16, the identity for the wireless device 14 may be a resume identifier or an inactive state RNTI, I-RNTI, that identifies a wireless device context in an RRC inactive state.

In either case, the identity for the wireless device 14 may include a bit or bit pattern that indicates the type of core network to which the wireless device 14 selects to connect.

In some embodiments, the method comprises receiving the RRC connection request 18 without integrity protection and/or confidentiality protection. In one or more such embodiments, the method may further comprise selecting, based on a type of core network indicated by the RRC connection request 18, a security algorithm to use to apply integrity protection and/or confidentiality protection to a response 20 to the RRC connection request 18. The method may then comprise applying integrity protection and/or confidentiality protection to the response 20 using the selected security algorithm, and transmitting the response 20 as integrity protected and/or confidentiality protected.

Alternatively or additionally, the method may comprise receiving the RRC connection request 18 on a first type of signaling bearer 22A that uses a first protocol stack. In one or more such embodiments, the method may further comprise selecting, based on a type of core network indicated by the RRC connection request 18 and from different possible protocol stacks supported by the radio network node, 12 a protocol stack to use for a second type of signaling bearer 22B on which to transmit a response 20 to the RRC connection request 18. In one embodiments, for example, the different possible protocol stacks have different versions of a packet data convergence protocol, PDCP. Regardless, the method may then comprise transmitting the response 20 to the RRC connection request 18 on the second type of signaling bearer 22B using the selected protocol stack.

Figure 5:
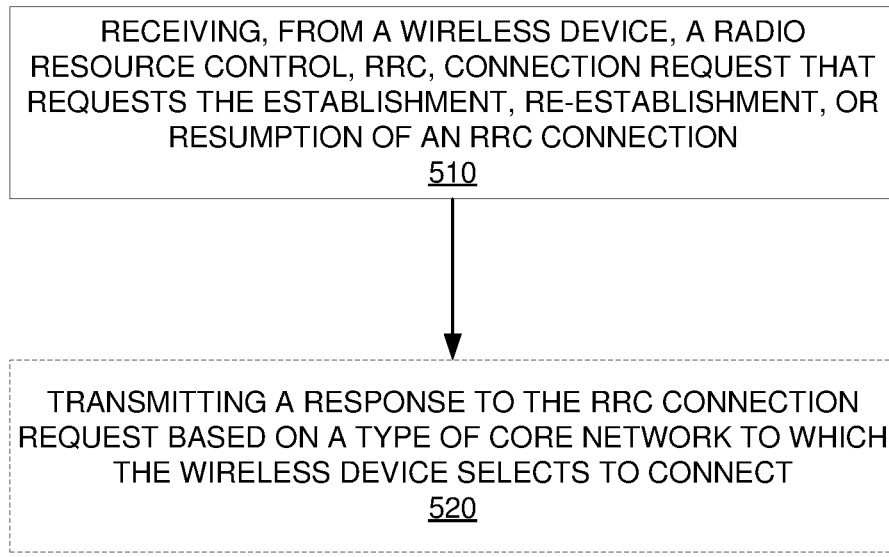
FIG. 5 is a logic flow diagram of a method performed by a radio network node according to other embodiments.

FIG. 5 depicts a method performed by a radio network node 12 (e.g., a base station) in accordance with yet other particular embodiments. The method includes receiving, from a wireless device 14, a radio resource control, RRC, connection request 18 that requests the establishment, re-establishment, or resumption of an RRC connection 16 (Block 510). The method also includes transmitting a response 20 to the RRC connection request 18 based on a type of core network to which the wireless device 14 selects to connect (Block 520).

In some embodiments, for example, such transmitting comprises determining, from different possible protocol stacks supported by the radio network node 12 for transmitting the response 20 to the RRC connection request 18 and based on a type of core network to which the wireless device 14 selects to connect, a protocol stack to use for transmitting the response 20 to the RRC connection request 18. The method may then comprise transmitting the response 20 to the RRC connection request 18 using the determined protocol stack.

Alternatively or additionally, the method comprises receiving the RRC connection request 18 without integrity protection and/or confidentiality protection. In this case, the method may comprise transmitting the response 20 to the RRC connection request 18 with the response 20 being integrity protected and/or confidentiality protected according to a security algorithm that depends on a type of core network to which the wireless device 14 selects to connect.

Alternatively or additionally, the method comprises receiving the RRC connection request 18 on a first type of signaling bearer 22A that uses a first protocol stack. In this case, the method may further comprise selecting, based on a type of core network indicated by the RRC connection request 18 and from different possible protocol stacks supported by the radio network node 12, a protocol stack to use for a second type of signaling bearer 22B on which to transmit a response 20 to the RRC connection request 18. In one embodiment, for example, the different possible protocol stacks have different versions of a packet data convergence protocol, PDCP. Regardless, the method may then comprise transmitting the response 20 to the RRC connection request 18 on the second type of signaling bearer 22B using the selected protocol stack.

Figure 6:
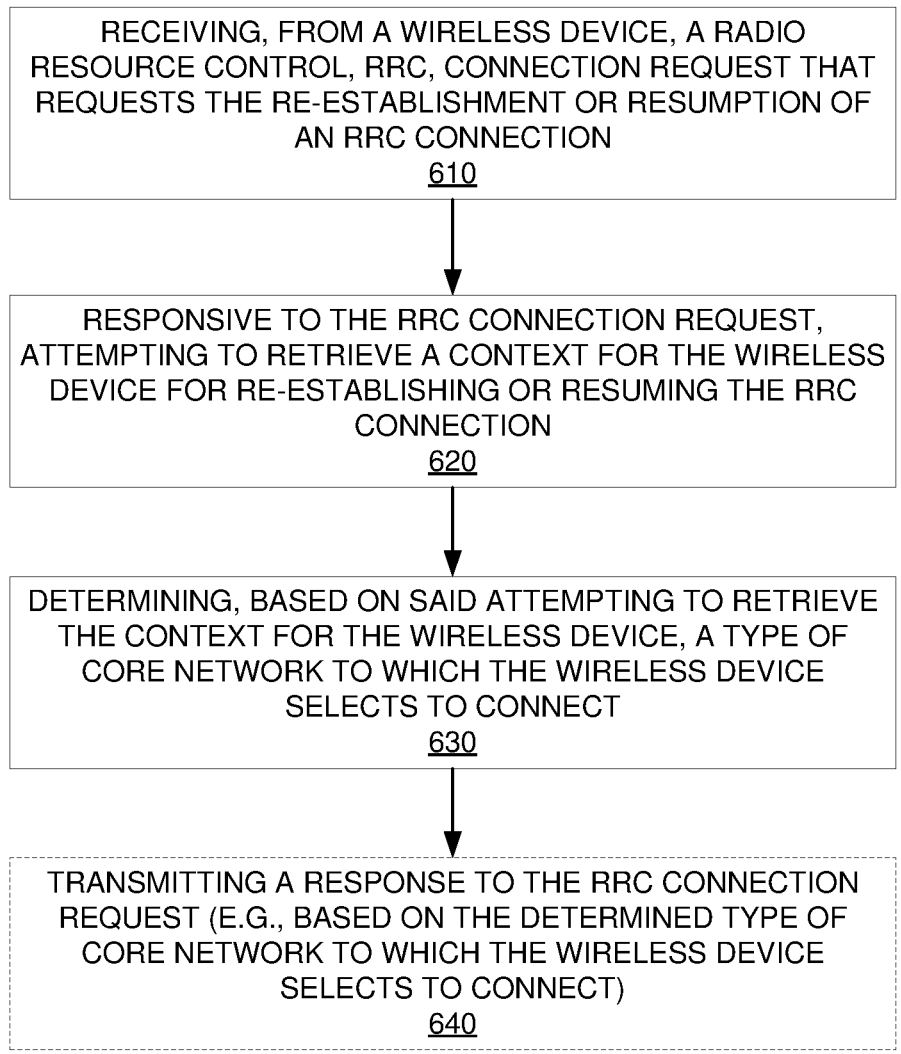
FIG. 6 is a logic flow diagram of a method performed by a radio network node according to still other embodiments.

FIG. 6 depicts a method performed by a radio network node 12 (e.g., a base station) in accordance with still other particular embodiments. The method includes receiving, from a wireless device 14, a radio resource control, RRC, connection request 18 that requests the re-establishment or resumption of an RRC connection 16 (Block 610). The method also includes, responsive to the RRC connection request 18, attempting to retrieve a context 14A for the wireless device 14 for re-establishing or resuming the RRC connection 16 (Block 620). The method further includes determining, based on said attempting to retrieve the context 14A for the wireless device 14, a type of core network to which the wireless device 14 selects to connect (Block 630).

In some embodiments, the method further comprises transmitting a response 20 to the RRC connection request 18, e.g., based on the determined type of core network to which the wireless device 14 selects to connect (Block 640).

In some embodiments, the method further comprises, before receiving the RRC connection request 18, releasing or suspending the RRC connection 16 and storing core network type information in the context 14A for the wireless device 14 or in association with the context 14A for the wireless device 14. The core network type information may indicate the type of core network to which the wireless device 14 selected to connect for the RRC connection 16. In this case, determining the type of core network may comprise determining said type based on the core network type information stored in or in association with the retrieved context 14A.

In other embodiments, the method may further comprise, before receiving the RRC connection request 18, releasing or suspending the RRC connection 16 and storing the context 14A for the wireless device 14 in one of multiple different possible storage locations respectively associated with different possible types of core networks selectable by the wireless device 14. In this case, said attempting may comprise attempting to retrieve the context 14A from one or more of the multiple different possible storage locations. Accordingly, determining the type of core network may comprise determining said type based on from which possible storage location the context 14A is successfully retrieved.

In yet other embodiments, attempting to retrieve the context 14A may comprise attempting to retrieve the context 14A for the wireless device 14 over one or more of multiple different types of interfaces to another radio network node respectively associated with different types of core networks. In this case, determining the type of core network may comprise determining said type based on over which type of interface the context 14A is successfully retrieved.

In some embodiments, the method may further comprise retrieving multiple candidate contexts that are candidates for being the context 14A for the wireless device 14. In this case, the method may further comprise determining which of the candidate contexts comprises the context 14A for the wireless device 14 based on which of the candidate contexts includes a security token that is verified by the radio network node 12.

In some embodiments, the method comprises receiving the RRC connection request 18 without integrity protection and/or confidentiality protection. The method may then further comprise selecting, based on the type of core network determined, a security algorithm to use to apply integrity protection and/or confidentiality protection to a response 20 to the RRC connection request 18. The method may then comprise applying integrity protection and/or confidentiality protection to the response 20 using the selected security algorithm, and transmitting the response 20 as integrity protected and/or confidentiality protected.

In some embodiments, the method comprises receiving the RRC connection request 18 on a first type of signaling bearer 22A that uses a first protocol stack. In this case, the method may further comprise selecting, based on the type of core network determined and from different possible protocol stacks supported by the radio network node 12, a protocol stack to use for a second type of signaling bearer 22B on which to transmit a response 20 to the RRC connection request 18. For example, the different possible protocol stacks may have different versions of a packet data convergence protocol, PDCP. Regardless, the method may then comprise transmitting the response 20 to the RRC connection request 18 on the second type of signaling bearer 22B.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
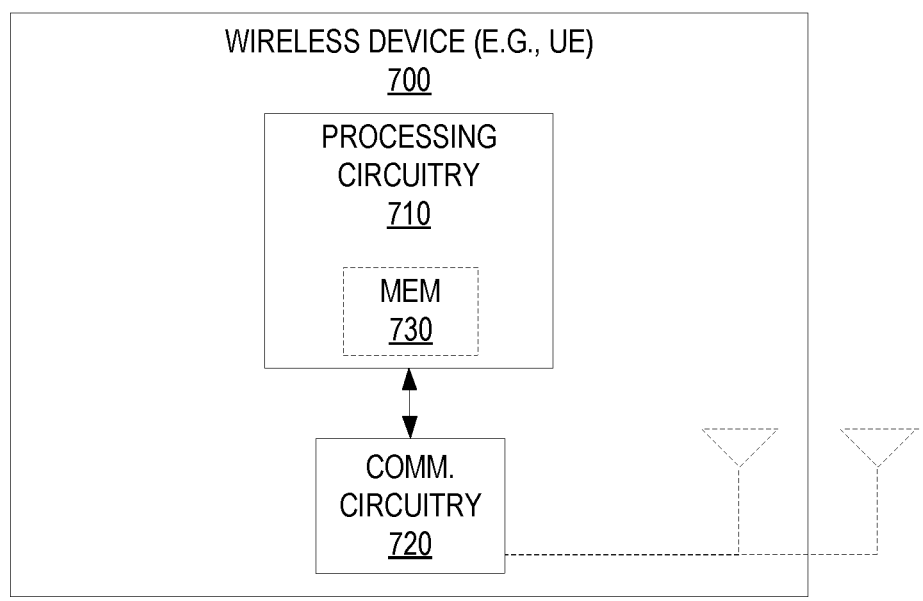
FIG. 7 is a block diagram of a wireless device according to some embodiments.

FIG. 7 for example illustrates a wireless device 700 (e.g., wireless device 14) as implemented in accordance with one or more embodiments. As shown, the wireless device 700 includes processing circuitry 710 and communication circuitry 720. The communication circuitry 720 (e.g., radio circuitry) is configured to transmit and/or receive information to and/or from one or more other nodes, e.g., via any communication technology. Such communication may occur via one or more antennas that are either internal or external to the wireless device 700. The processing circuitry 710 is configured to perform processing described above (e.g., in Figures WW1 and WW2), such as by executing instructions stored in memory 730. The processing circuitry 710 in this regard may implement certain functional means, units, or modules.

Figure 8:
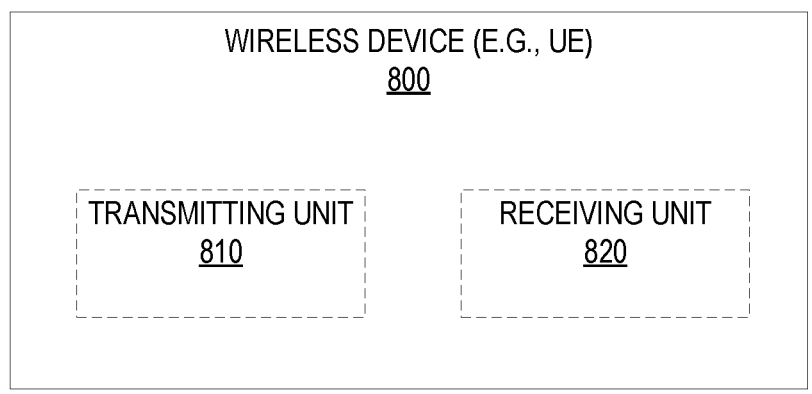
FIG. 8 is a block diagram of a wireless device according to other embodiments.
Figure 16:
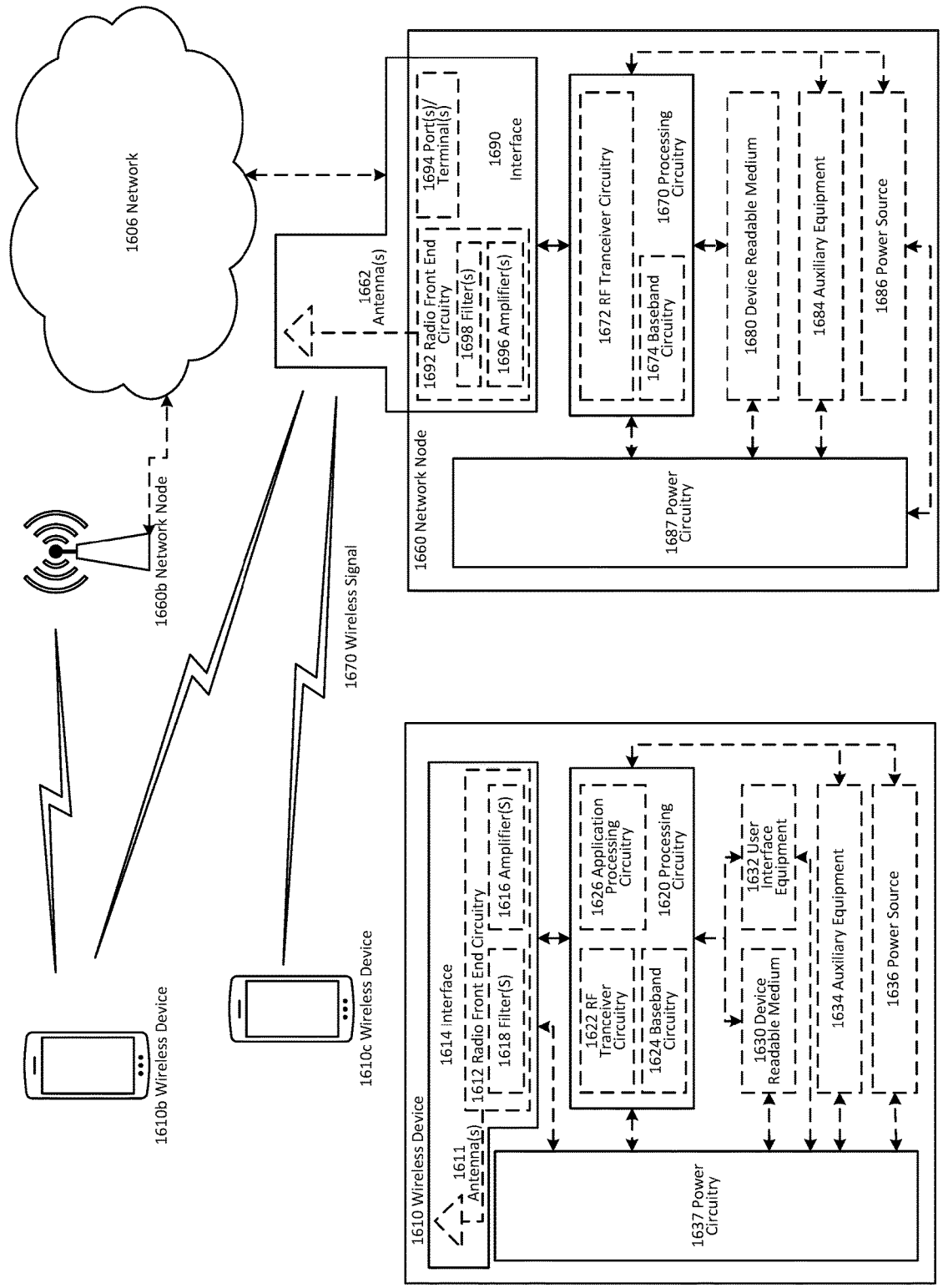
FIG. 16 is a block diagram of a wireless communication network according to some embodiments.

FIG. 8 illustrates a schematic block diagram of a wireless device 800 (e.g., wireless device 14) in a wireless network according to still other embodiments (for example, the wireless network shown in FIG. 16). As shown, the wireless device 800 implements various functional means, units, or modules, e.g., via the processing circuitry 710 in FIG. 7 and/or via software code. These functional means, units, or modules, e.g., for implementing the method(s) herein, include for instance a transmitting unit 810 for transmitting an RRC connection request 18 as described above. Alternatively or additionally, a receiving unit 820 may be included for receiving a response 20 to the RRC connection request 18 as described above.

Figure 9:
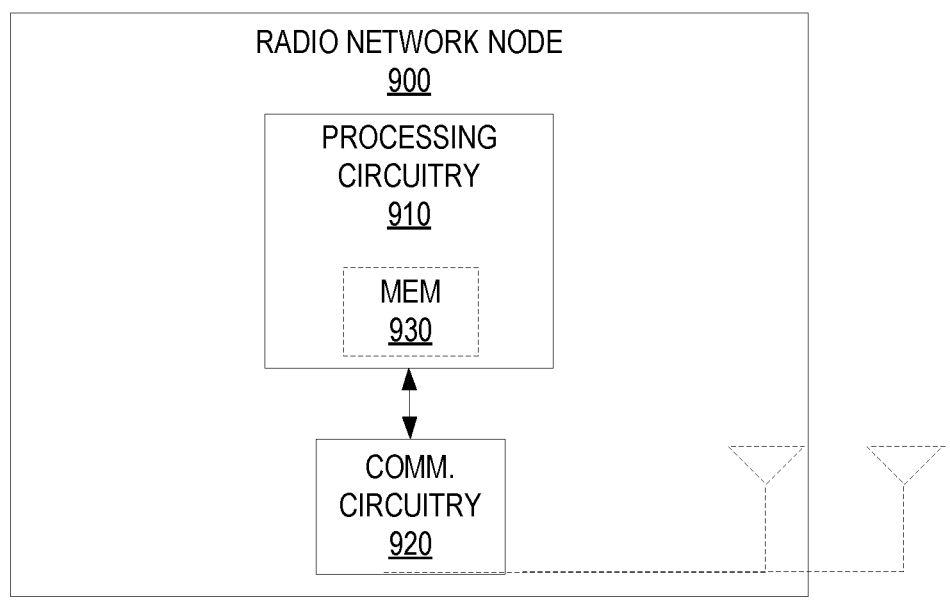
FIG. 9 is a block diagram of a radio network node according to some embodiments.

FIG. 9 illustrates a radio network node 900 (e.g., radio network node 12) as implemented in accordance with one or more embodiments. As shown, the radio network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above (e.g., in Figures WW3, WW4, and/or WW5), such as by executing instructions stored in memory 930. The processing circuitry 910 in this regard may implement certain functional means, units, or modules.

Figure 10:
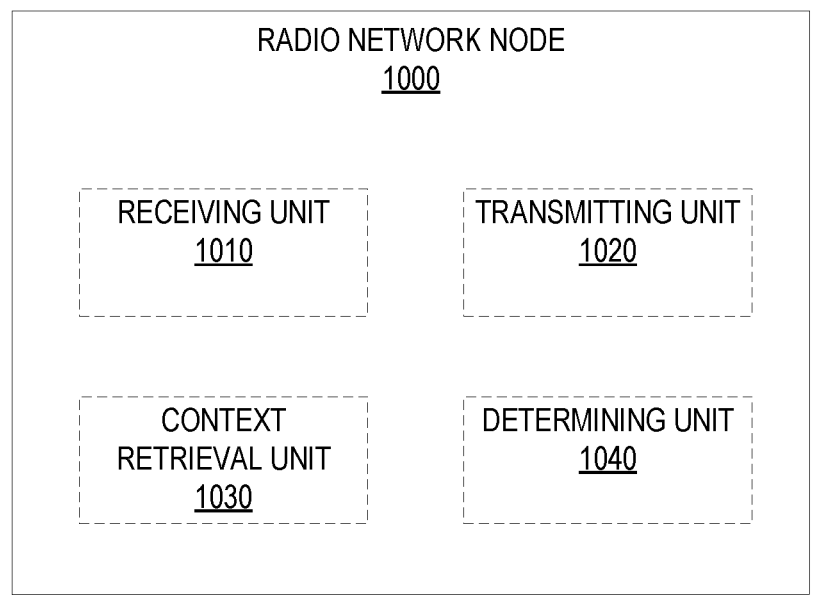
FIG. 10 is a block diagram of a radio network node according to other embodiments.

FIG. 10 illustrates a schematic block diagram of a radio network node 1000 (e.g., radio network node 12) in a wireless network according to still other embodiments (for example, the wireless network shown in FIG. 16). As shown, the radio network node 1000 implements various functional means, units, or modules, e.g., via the processing circuitry 910 in FIG. 9 and/or via software code. These functional means, units, or modules, e.g., for implementing the method(s) herein, include for instance a receiving unit 1010 receiving, from a wireless device, a radio resource control, RRC, connection request 18 that requests the re-establishment or resumption of an RRC connection 16. In some embodiments, the RRC connection request 18 indicates a type of core network to which the wireless device 14 selects to connect. Alternatively or additionally, a transmitting unit 1020 may be included for transmitting a response 20 to the RRC connection request 18 based on a type of core network to which the wireless device 14 selects to connect. Alternatively or additionally, a context retrieval unit 1030 may be included for, responsive to the RRC connection request 18, attempting to retrieve a context 14A for the wireless device 14 for re-establishing or resuming the RRC connection and a determining unit 1040 may be included for determining, based on said attempting to retrieve the context 14A for the wireless device 14, a type of core network to which the wireless device 14 selects to connect.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Although embodiments herein have been described with respect to an RRC connection 16, embodiments herein are extendable to other types of connections. Some embodiments for example extend to any type of control plane connection or signalling connection between the wireless device 14 and the radio network node 12.

Additional embodiments will now be described. At least some of these embodiments may be described as applicable in certain contexts and/or wireless network types for illustrative purposes, but the embodiments are similarly applicable in other contexts and/or wireless network types not explicitly described.

The 5G system defined by 3GPP Rel-15 includes both a new radio access network (NG-RAN) and a new core network (5G-CN).

Figure 11:
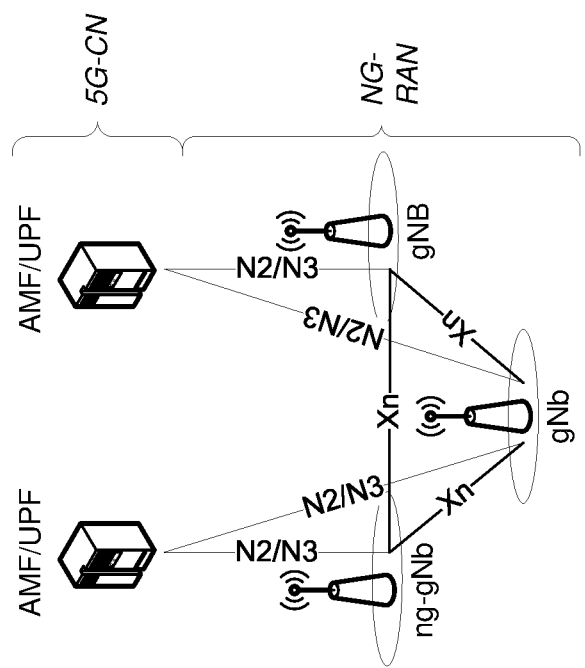
FIG. 11 is a block diagram of a Next Generation Radio Access Network (NG-RAN) connected to a 5G Core Network (5G-CN) according to some embodiments.

Similar to the Evolved Universal Terrestrial Radio Access Network (E-UTRAN), the NG-RAN as shown in FIG. 11 uses a flat architecture and consists of base stations, called gNBs, which are inter-connected via the Xn-interface and towards the core network by the N2/N3-interface. The gNB in turn supports one or more cells which provides the radio access to the UE. The radio access technology (called next radio, NR) is Orthogonal Frequency Division Multiplex (OFDM) based like in LTE and offers high data transfer speeds and low latency.

It is expected that NR will be rolled out gradually on top of the legacy LTE network starting in areas where high data traffic is expected. This means that NR coverage will be limited in the beginning and users must move between NR and LTE as they go in and out of coverage. To support fast mobility between NR and LTE and avoid change of core network, LTE eNBs will also connect to the 5G-CN and support the Xn interface as shown in FIG. 11. An eNB connected to 5GC is called a next generation eNB (ng-eNB) and is considered part of the NG-RAN.

An eNB may at the same time be connected to both EPC (i.e. the eNB is part of legacy E-UTRAN) and 5GC (i.e. the eNB is an ng-eNB belonging to ng-RAN). The term eNB as used herein may refer to both an eNB and ng-eNB unless there is specific need to distinguish between the two.

Figure 12:
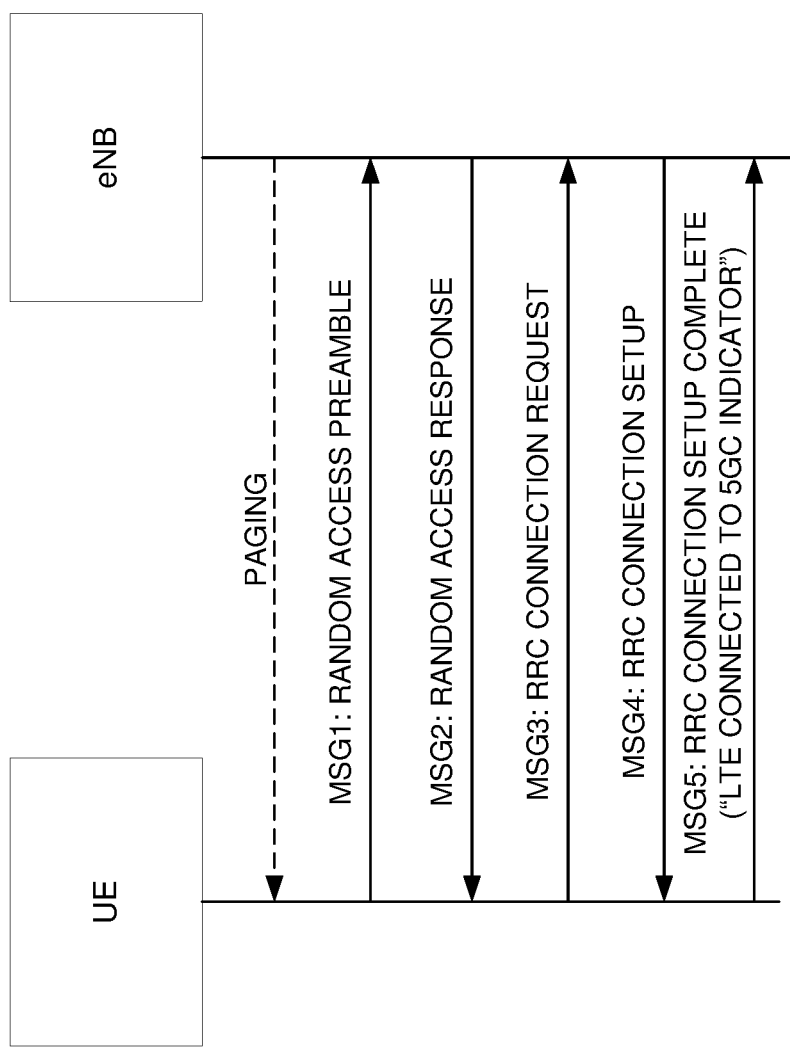
FIG. 12 is a call flow diagram of a radio resource control (RRC) connection establishment procedure according to some embodiments.

FIG. 12 shows the RRC connection setup procedure for LTE/5GC. The procedure includes the UE transmitting a random access preamble (MSG1) to the eNB, e.g., responsive to receiving paging from the eNB. The eNB transmits a random access response (MSG2) to the UE. The UE then transmits an RRC connection request (MSG3) to the eNB and receives in response an RRC connection setup (MSG4). The UE next transmits an RRC connection setup complete message (MSG5) to the eNB. Accordingly, the RRC connection setup procedure in LTE/5GC is almost identical to the one in LTE/EPC and in particular the RRC messages and message sequence are the same. The main difference is in MSG5 (RRC Connection Setup Complete) which includes an indication that the UE is connecting to 5GC instead of EPC. In the same way as in LTE/EPC, MSG3 and MSG4 are sent on Signaling Radio Bearer 0 (SRB0) and MSG5 is sent on Signaling Radio Bearer 1 (SRB1).

As noted earlier, an eNB may at the same time be connected to both EPC and 5GC. Thus, the eNB will receive RRC connection establishment requests from both LTE/EPC and LTE/5GC UEs. Furthermore, the eNB heretofore may not be able to distinguish between the two types UEs (namely, a UE connected to LTE/EPC and a UE connected to LTE/5GC) until the "LTE connected to 5GC indication" is received in MSG5.

The fact that the eNB is heretofore not able to determine the UE type (or, in other words, the type of core network to which the UE is connecting) until after MSG5 causes a problem for SRB1 which uses a slightly different protocol stack in LTE/5GC than in LTE/EPC. As can be seen in FIG. 13A, SRB1 in LTE/EPC uses the LTE version of the PDCP layer, whereas as seen in FIG. 13B SRB1 in LTE/5GC uses the NR version of PDCP. This means that when MSG5 is sent by the UE on SRB1, the eNB heretofore does not know whether it should receive it using LTE PDCP or NR PDCP. To solve this problem, LTE/5GC could use LTE PDCP for SRB1 initially and then switch to NR PDCP after MSG5 is sent.

A similar PDCP version issue arises also for RRC connection re-establishment and RRC connection resume in LTE/5GC.

Figure 14:
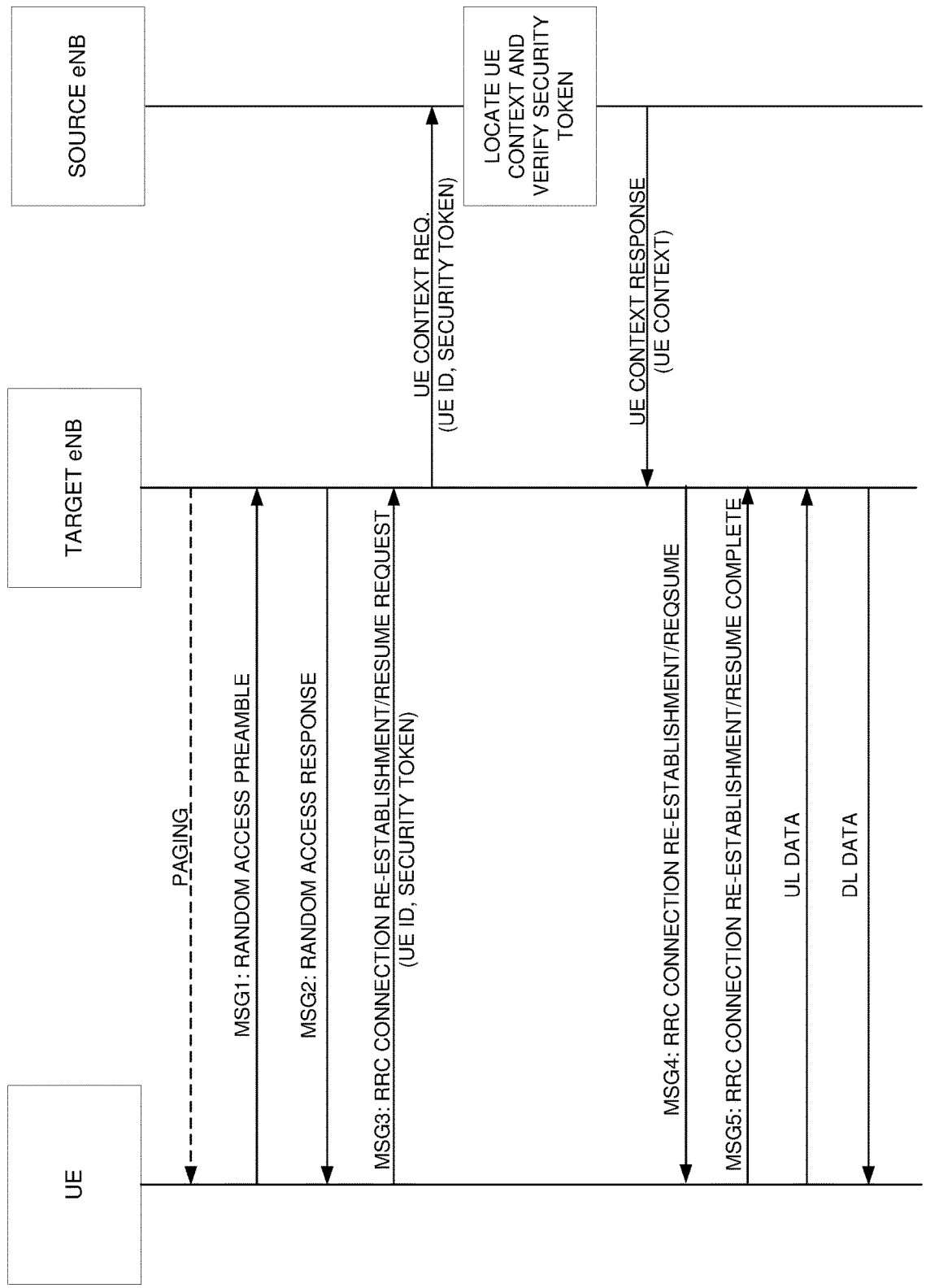
FIG. 14 is a call flow diagram of an RRC re-establishment/resume procedure according to some embodiments.

FIG. 14 shows the RRC connection re-establishment and RRC connection resume procedures for LTE/5GC. The RRC connection re-establishment/resume procedure in LTE/5GC is very similar to the one in LTE/EPC and the RRC messages and message sequences are the same. In the RRC connection re-establishment/resume procedure, MSG3 is sent on SRB0 and MSG4 and MSG5 are sent on SRB1. Furthermore, both intra- and inter-eNB re-establishment/resume is supported. In case of inter-eNB re-establishment/resume, the target eNB fetches the UE context from the source eNB using the UE ID included in the MSG3 (containing the RRC connection re-establishment/resume request).

When the eNB receives MSG3 (containing the RRC connection re-establishment/resume request) on SRB0, it heretofore is not yet be able to determine the UE type. This means that the eNB heretofore does not know which PDCP version to use when it sends MSG4 on SRB1.

One potential solution to handle the PDCP version issue at RRC connection re-establishment/RRC connection resume would be to revert to LTE PDCP for SRB1 at the start of the procedure and then switch back to NR PDCP after MSG5 is sent. Apart from causing unnecessary switching between PDCP versions, the problem with this approach is that it requires the UE to change from an 5GS to EPS security algorithm. This is because, unlike RRC connection establishment, MSG4 is sent protected at RRC connection re-establishment/RRC connection resume and the security algorithm used is dependent on the PDCP layer. Currently, changing the security algorithm would not be much of a problem, since the security algorithms are currently identical in EPS and 5GS. But it could potentially become a problem in the future if different security algorithms are introduced in EPS and 5GS.

Certain aspects of the present disclosure and their embodiments may provide solutions to these or other challenges. When a UE re-establishes or resumes an RRC connection, the eNB according to some embodiments determines the UE type (also referred to as CN type to which the UE is connecting) already at MSG3 in the RRC connection re-establishment/resume procedure. This may be done either by (1) indicating the UE type in MSG3, or (2) by determining the UE type based on UE identity included in MSG3, or (3) by determining the UE type from the retrieved UE context. According to some embodiments, this avoids the UE having to switch from NR PDCP to LTE PDCP.

Certain embodiments may provide one or more of the following technical advantage(s). Some embodiments allow an LTE/5GC UE to re-establish or resume an RRC connection without having to switch PDCP versions for SRB1. This in turn has one or more of the following advantages: (i) Simplifies UE implementation as well as the 3GPP specification; (ii) Features available in NR PDCP but not in LTE PDCP can be used also during RRC connection re-establishment/resume; and/or (iii) a UE is not required to switch between EPS and 5GS security algorithms, which means that the EPS and 5GS security algorithms can evolve independently without requiring a mapping between two sets of algorithms.

Note that the below embodiments may refer to "UE type". The UE type as used below may be used interchangeably with CN type used above, depending on context. The UE type may for instance indicate a type of CN to which a UE selects (or is capable of selecting) to connect, e.g., to distinguish that UE from another UE which selects (or is capable of selecting) to connect to a different type of CN.

To avoid switching from NR PDCP to LTE PDCP when a UE re-establishes or resumes an RRC connection, the eNB according to some embodiments determines the UE type (and thereby the PDCP version to use) already at MSG3 in the RRC connection re-establishment/resume procedure. This is done either by (1) indicating the UE type in MSG3, or (2) by determining the UE type based on UE identity included in MSG3, or (3) by determining the UE type from the retrieved UE context. Each solution is described in more detail below.

In the first solution, the LTE/5GC UE includes an indication in MSG3 which allows the eNB to distinguish the UE from a legacy LTE/EPC UE. The indication can either be explicit such as a flag indicating the UE type, or it can be implicit based on, e.g., the message type or presence/absence of certain parameter.

The second solution avoids any changes to MSG3 and instead the eNB determines the UE type based on the UE identity included in MSG3. This is done by coordinating the allocation of the UE identity in E-UTRAN and NG-RAN so that the RAN type can be determined from the UE identity. The details differ between resume and re-establishment since the UE identity is constructed differently for these procedures. For re-establishment, the UE ID is comprised of C-RNTI, Physical Cell Identity (PCI) and Security Token (Short MAC-I). For resume, the UE ID is comprised of the Resume ID (LTE/EPC) or I-RNTI (LTE/5GC).

In case of re-establishment the only part of the UE ID that can be set by the eNB is the C-RNTI. This means that to be able to distinguish the UE type based on UE identity, all eNBs would need to allocate different C-RNTIs for UEs connected to EPC and 5GC. For example, the first bit of C-RNTI could be set to 0 for LTE/EPC UEs and to 1 for LTE/5GC UEs.

As can be seen, a different UE ID is used for the resume procedure in LTE/EPC and LTE/5GC (Resume ID and I-RNTI, respectively). However, if the Resume ID and I-RNTI are of the same length and are included in the same field in the RRC connection resume request, the eNB will still not be able to distinguish between them. One way to accomplish this is to coordinate the allocation of the Resume ID and I-RNTI between E-UTRAN and NG-RAN. For example, the last bit of the Resume ID could always be set to 0 whereas the last bit of the I-RNTI would be set to 1. The same is true if the I-RNTI and Resume ID are of different lengths and the I-RNTI and/or Resume ID are truncated to the same length and included in the same field in MSG3.

In case the I-RNTI size is smaller than the Resume ID, it still would have to fit in the Resume ID space in LTE to support legacy MSG3 structure. So, the remaining bits could be filled with a filler bit pattern which indicates that it is an I-RNTI instead of a Resume ID. In this case, E-UTRAN would need to ensure that the particular filler bit pattern is not used when the Resume IDs are allocated.

In the third solution, the eNB determines the UE type based on the UE context. In case of intra-eNB re-establishment/resume, the eNB can e.g. store the UE type together with the UE context or it can store the UE contexts for the UE types in different locations. In case of inter-eNB re-establishment/resume, the interface used to retrieve the context is dependent on the UE type (X2 in E-UTRAN and Xn in NG-RAN). The eNB can therefore determine the UE type by trying both interfaces (either sequentially or in parallel) to see which one succeeds.

Due to an identity collision (e.g. same I-RNTI/Resume ID used in E-UTRAN and NG-RAN), it may happen that two UE contexts are found, i.e. one for E-UTRAN and one for NGRAN. However, in this case the correct UE context can be determined when the security token is verified. For example, in the case of inter-eNB resume, the context fetch procedure will still only succeed for one of the interfaces since the source eNB will detect the "false" UE context when it verifies the security token (the short MAC-I from MSG3).

Figure 15:
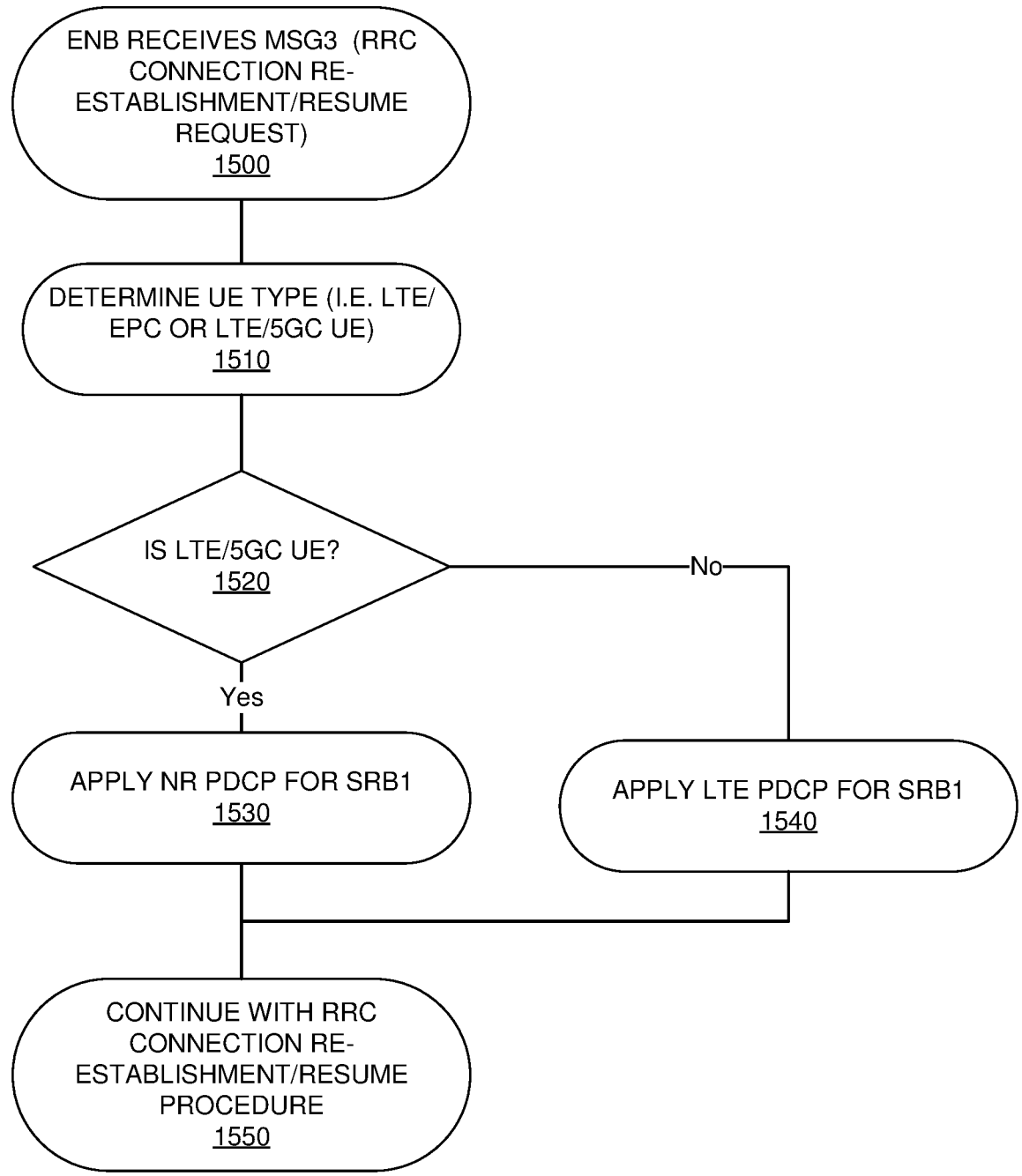
FIG. 15 is a logic flow diagram of a method performed by an eNB for RRC connection re-establishment/resume according to some embodiments.

FIG. 15 shows a process for RRC connection re-establishment or resume according to some embodiments. As shown, the eNB first receives MSG3 in the form of an RRC connection re-establishment/resume request (Block 1500). The eNB then determines the UE type (i.e., an LTE/EPC UE or an LTE/5GC UE) (Block 1510). Determining the UE type may differ in implementation depending on which solution above is used. If the UE is an LTE/5GC UE (Yes at Block 1520), the eNB applies the NR PDCP for SRB1 (Block 1530). If the UE is not an LTE/5GC UE (No at Block 1520), the eNB applies the LTE PDCP for SRB1 (Block 1540). Either way, the eNB continues with the RRC connection re-establishment/resume procedure (Block 1550).

The discussion above has only considered the situation where the gNB is connected to both EPC and 5GC. Some embodiments also consider what happens when a LTE/5GC UE attempts to re-establish or resume an RRC connection in an eNB that only supports EPC. In this case, the UE according to a first solution moves to RRC_IDLE state and performs a regular RRC connection setup when it discovers that the selected cell is an EPC-only cell.

According to a second solution, the UE goes ahead with the RRC connection re-establishment/resume. In option 'a', the eNB rejects the UE on SRB0 (since the X2 UE context fetch procedure fails) which causes the UE to move to RRC_IDLE and perform a normal connection setup. In option 'b', the eNB manages to retrieve the UE context over X2, but since the eNB is LTE/5GC unaware, LTE PDCP is used for SRB1. In option 'c', the eNB manages to retrieve the UE context over X2 and is aware that the UE is a LTE/5GC UE and therefore applies NR PDCP for SRB1. Note that option 'b' and 'c' both require that an NG-RAN UE context can be transformed into an E-UTRAN context and fetched over X2.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and WDs 1610, 1610b, and 1610c. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 17:
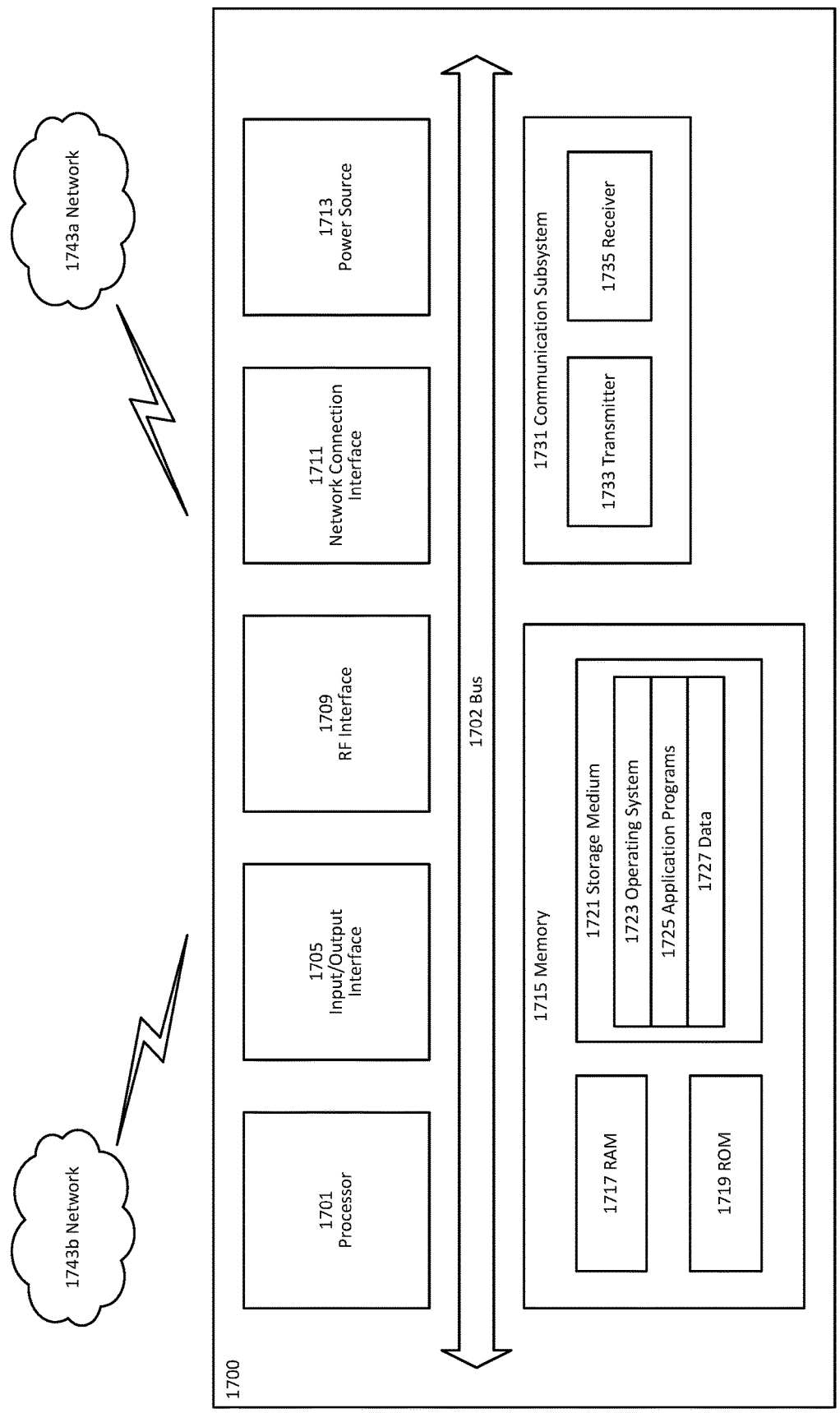
FIG. 17 is a block diagram of a user equipment according to some embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 17200 may be any UE identified by the 3rd Generation Partnership Project (3GPP), including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by the 3 rd Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743a. Network 1743a may encompass wired and/or wireless networks such as a local-area network (LAN), a wide-area network (WAN), a computer network, a wireless network, a telecommunications network, another like network or any combination thereof. For example, network 1743a may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743*b* using communication subsystem 1731. Network 1743*a* and network 1743*b* may be the same network or networks or different network or networks. Communication subsystem 1731 may be configured to include one or more transceivers used to communicate with network 1743*b*. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743*b* may encompass wired and/or wireless networks such as a local-area network (LAN), a wide-area network (WAN), a computer network, a wireless network, a telecommunications network, another like network or any combination thereof. For example, network 1743*b* may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
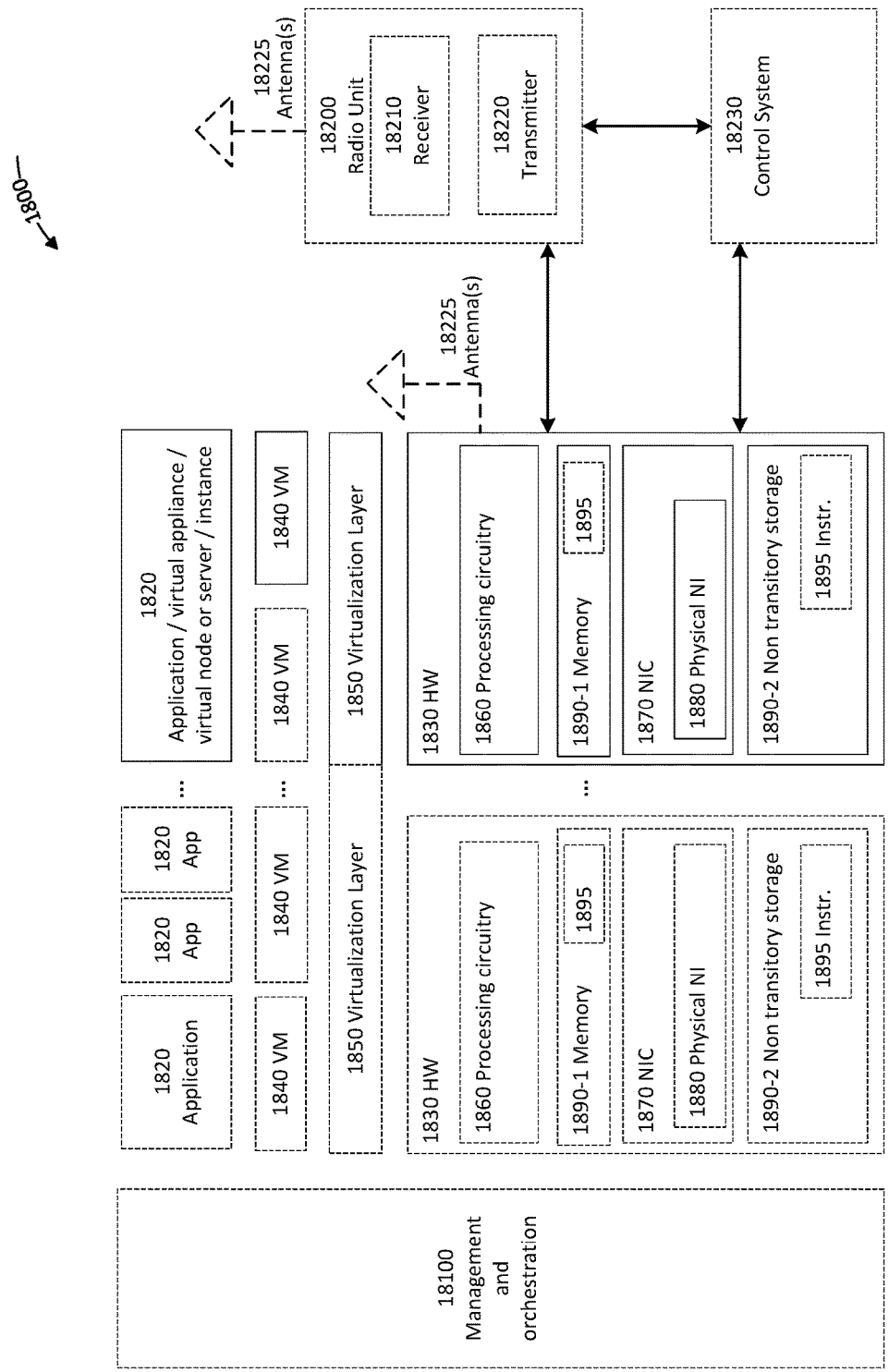
FIG. 18 is a block diagram of a virtualization environment according to some embodiments.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 18230 which may alternatively be used for communication between the hardware nodes 1830 and radio units 18200.

Figure 19:
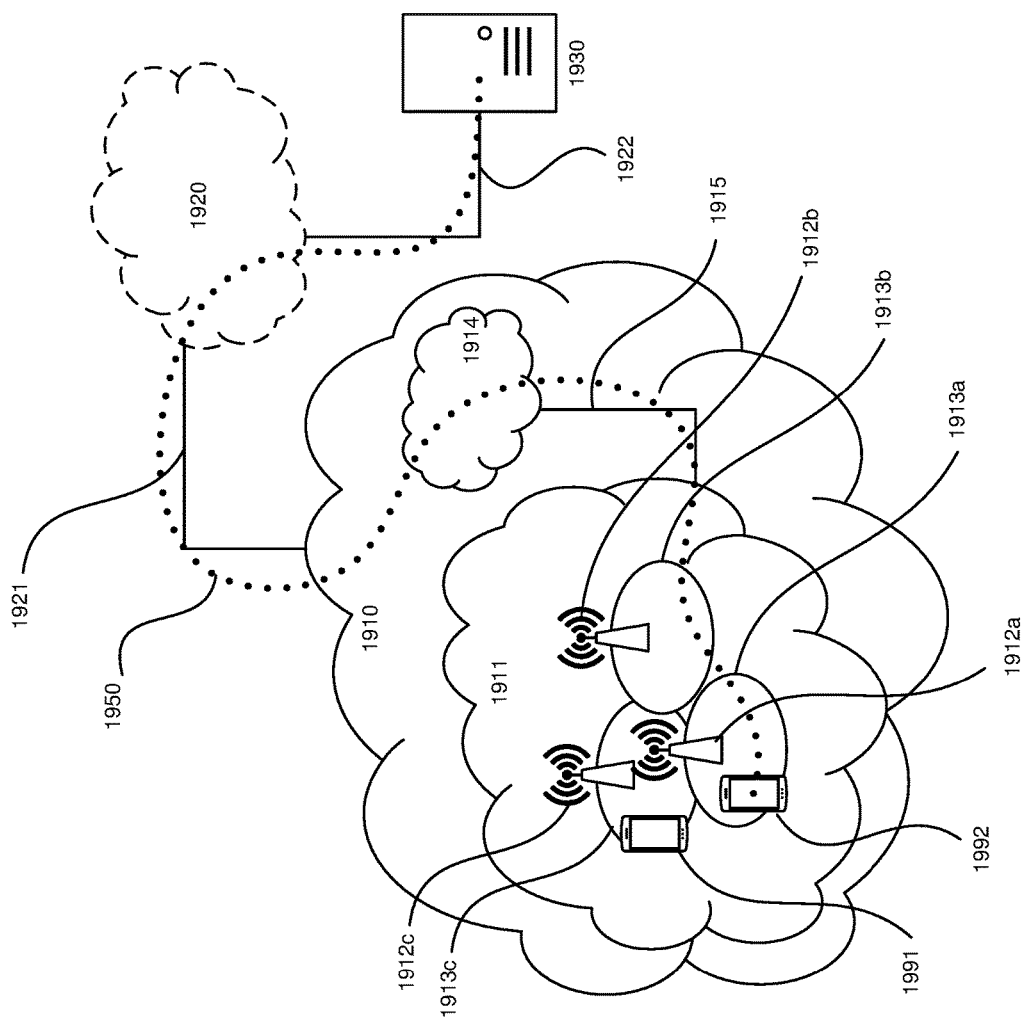
FIG. 19 is a block diagram of a communication network with a host computer according to some embodiments.

FIG. 19 illustrates a telecommunication network connected via an intermediate network to a host computer in accordance with some embodiments. In particular, with reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912*a*, 1912*b*, 1912*c*, such as NBs, eNBs, gNBs or other types of wireless access points, each defining a corresponding coverage area 1913*a*, 1913*b*, 1913*c*. Each base station 1912*a*, 1912*b*, 1912*c* is connectable to core network 1914 over a wired or wireless connection 1915. A first UE 1991 located in coverage area 1913*c* is configured to wirelessly connect to, or be paged by, the corresponding base station 1912*c*. A second UE 1992 in coverage area 1913*a* is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 20:
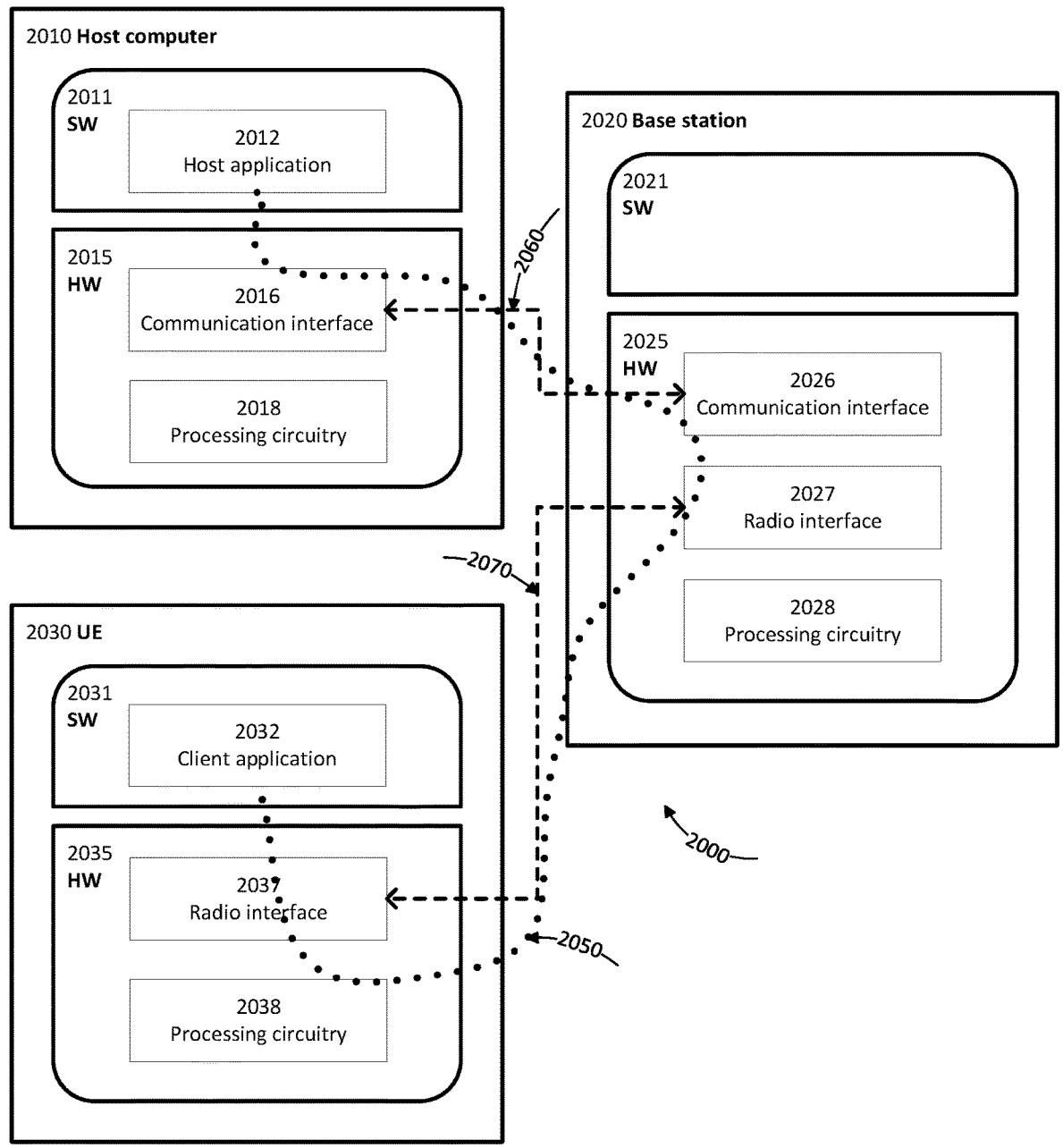
FIG. 20 is a block diagram of a host computer according to some embodiments.

Example implementations, in accordance with an embodiment, of the UE, base station and host computer discussed in the preceding paragraphs will now be described with reference to FIG. 20. FIG. 20 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 20 may be similar or identical to host computer 1930, one of base stations 1912a, 1912b, 1912c and one of UEs 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve the complexity and security of a radio network node and wireless device.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 21:
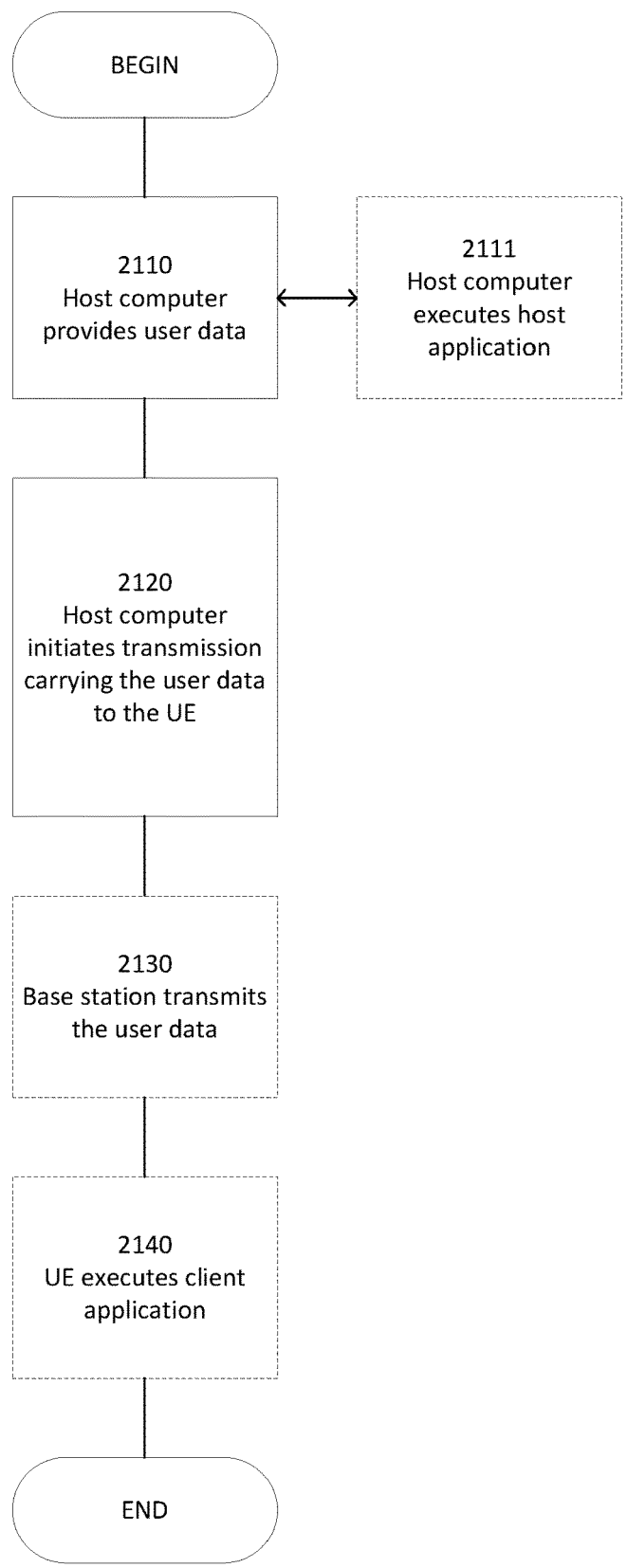
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
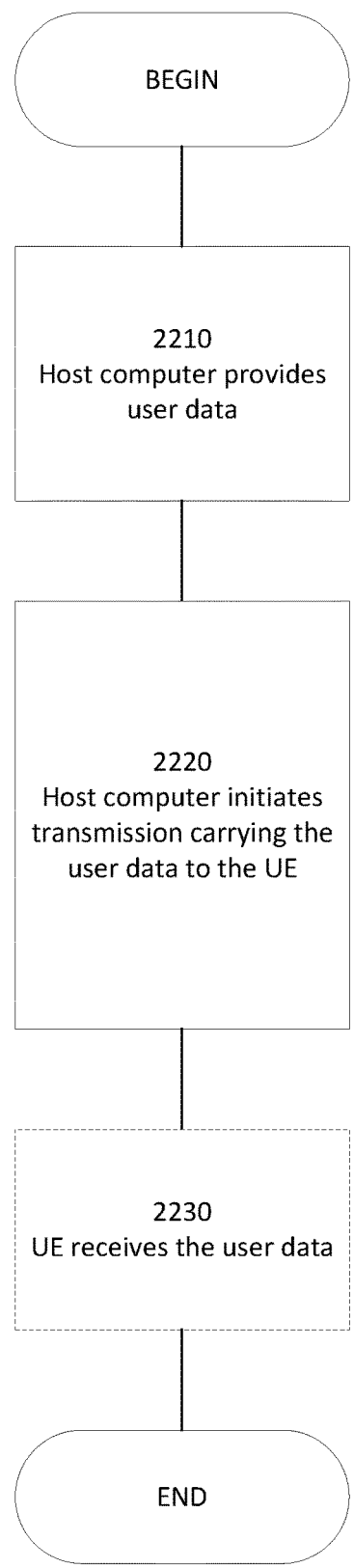
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 23:
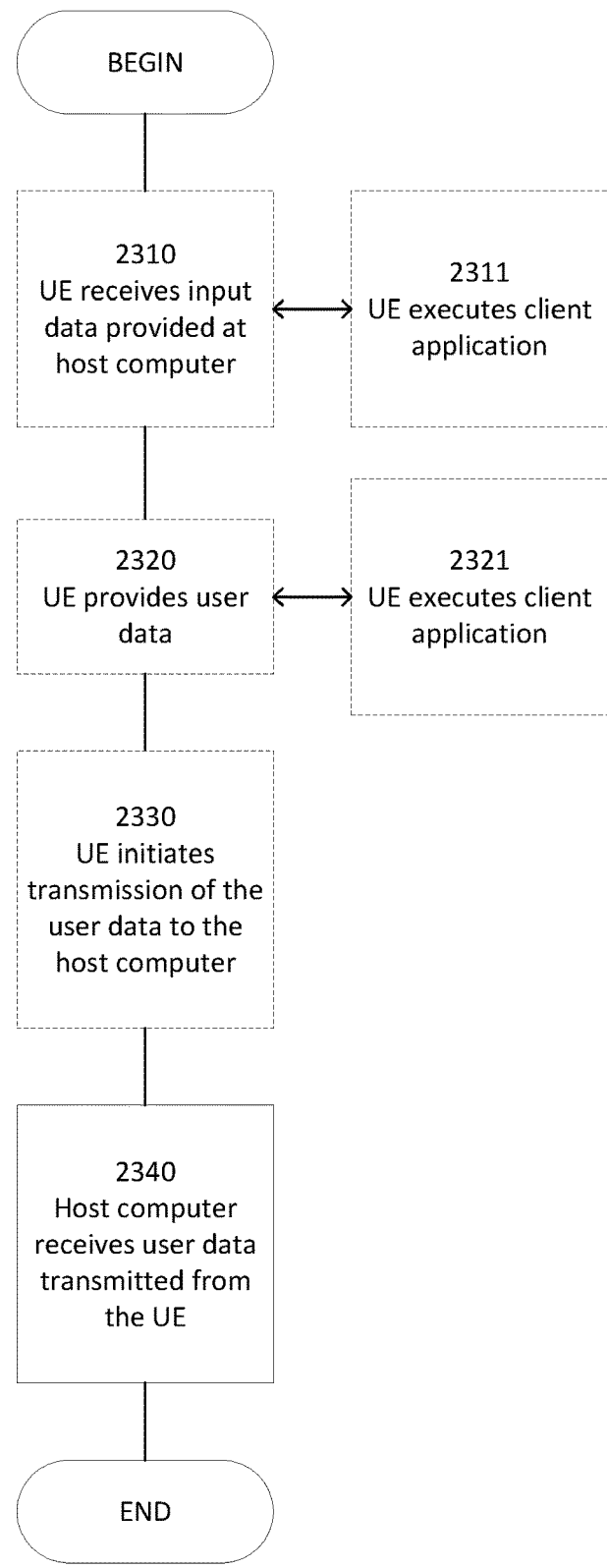
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 24:
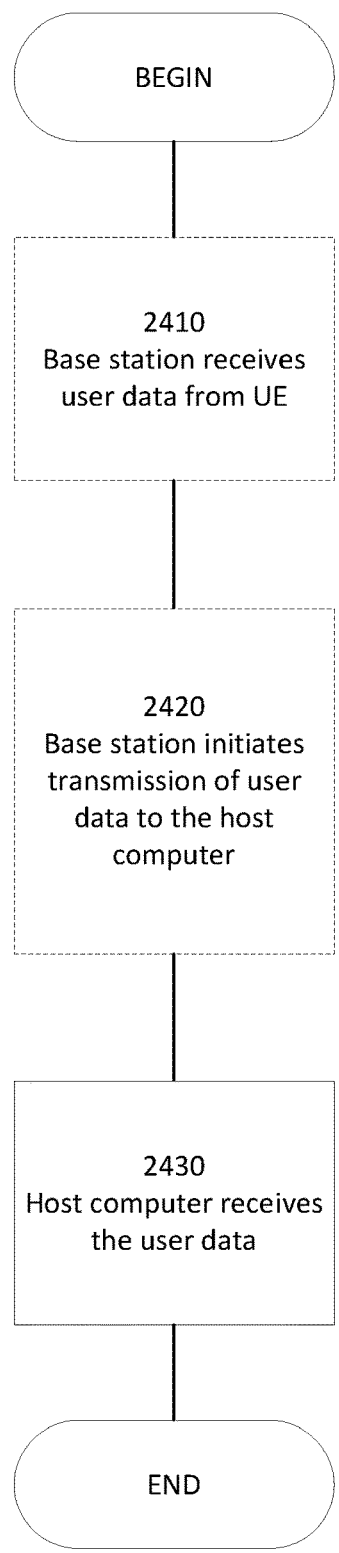
FIG. 24 is a flowchart illustrating a method implemented in a communication system, in accordance with one embodiment.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a radio network node, the method comprising:
   receiving, from a wireless device, a radio resource control (RRC) connection request that requests re-establishment or resumption of an RRC connection;
   responsive to the RRC connection request, attempting to retrieve a context for the wireless device for re-establishing or resuming the RRC connection; and
   determining, based on said attempting to retrieve the context for the wireless device, a type of core network to which the wireless device selects to connect;
   wherein either:
      the method further comprises, before receiving the RRC connection request, releasing or suspending the RRC connection and storing core network type information in the context for the wireless device or in association with the context for the wireless device, wherein the core network type information indicates the type of core network to which the wireless device selected to connect for the RRC connection, wherein said determining comprises determining said type based on the core network type information stored in or in association with the retrieved context; or
      the method further comprises, before receiving the RRC connection request, releasing or suspending the RRC connection and storing the context for the wireless device in one of multiple different possible storage locations respectively associated with different possible types of core networks selectable by the wireless device, wherein said attempting comprises attempting to retrieve the context from one or more of the multiple different possible storage locations and wherein said determining comprises determining said type based on from which possible storage location the context is successfully retrieved; or
      said attempting comprises attempting to retrieve the context for the wireless device over one or more of multiple different types of interfaces to another radio network node respectively associated with different types of core networks, and said determining comprises determining said type based on over which type of interface the context is successfully retrieved.

2. The method of claim 1, wherein the method comprises, before receiving the RRC connection request, releasing or suspending the RRC connection and storing core network type information in the context for the wireless device or in association with the context for the wireless device, wherein the core network type information indicates the type of core network to which the wireless device selected to connect for the RRC connection, wherein said determining comprises determining said type based on the core network type information stored in or in association with the retrieved context.

3. The method of claim 1, wherein the method comprises, before receiving the RRC connection request, releasing or suspending the RRC connection and storing the context for the wireless device in one of multiple different possible storage locations respectively associated with different possible types of core networks selectable by the wireless device, wherein said attempting comprises attempting to retrieve the context from one or more of the multiple different possible storage locations and wherein said determining comprises determining said type based on from which possible storage location the context is successfully retrieved.

4. The method of claim 3, further comprising retrieving multiple candidate contexts that are candidates for being the context for the wireless device, and determining which of the candidate contexts comprises the context for the wireless device based on which of the candidate contexts includes a security token that is verified by the radio network node.

5. The method of claim 1, wherein said attempting comprises attempting to retrieve the context for the wireless device over one or more of multiple different types of interfaces to another radio network node respectively associated with different types of core networks, and wherein said determining comprises determining said type based on over which type of interface the context is successfully retrieved.

6. The method of claim 1, further comprising transmitting a response to the RRC connection request based on the type of core network determined.

7. The method of claim 1, comprising receiving the RRC connection request without integrity protection and/or confidentiality protection, and further comprising:
   selecting, based on the type of core network determined, a security algorithm to use to apply integrity protection and/or confidentiality protection to a response to the RRC connection request;
   applying integrity protection and/or confidentiality protection to the response using the selected security algorithm; and
   transmitting the response as integrity protected and/or confidentiality protected.

8. The method of claim 1, comprising receiving the RRC connection request on a first type of signaling bearer that uses a first protocol stack, and further comprising:
   selecting, based on the type of core network determined and from different possible protocol stacks supported by the radio network node, a protocol stack to use for a second type of signaling bearer on which to transmit a response to the RRC connection request; and
   transmitting the response to the RRC connection request on the second type of signaling bearer using the selected protocol stack.

9. A radio network node comprising:
   communication circuitry; and
   processing circuitry configured to:
      receive, from a wireless device, a radio resource control, RRC, connection request that requests re-establishment or resumption of an RRC connection;
      responsive to the RRC connection request, attempt to retrieve a context for the wireless device for re-establishing or resuming the RRC connection; and
      determine, based on said attempting to retrieve the context for the wireless device, a type of core network to which the wireless device selects to connect;
      wherein either:
         the processing circuitry is further configured to, before receiving the RRC connection request, release or suspend the RRC connection and store core network type information in the context for the wireless device or in association with the context for the wireless device, wherein the core network type information indicates the type of core network to which the wireless device selected to connect for the RRC connection, wherein said type of core network is determined based on the core network type information stored in or in association with the retrieved context; or the processing circuitry is further configured to, before receiving the RRC connection request, release or suspend the RRC connection and store the context for the wireless device in one of multiple different possible storage locations respectively associated with different possible types of core networks selectable by the wireless device, wherein the processing circuitry is configured to attempt to retrieve the context from one or more of the multiple different possible storage locations and to determine said type based on from which possible storage location the context is successfully retrieved; or the processing circuitry is configured to attempt to retrieve the context for the wireless device over one or more of multiple different types of interfaces to another radio network node respectively associated with different types of core networks, and to determine said type based on over which type of interface the context is successfully retrieved.

10. The radio network node of claim 9, the processing circuitry further configured to, before receiving the RRC connection request, release or suspend the RRC connection and store core network type information in the context for the wireless device or in association with the context for the wireless device, wherein the core network type information indicates the type of core network to which the wireless device selected to connect for the RRC connection, wherein said type of core network is determined based on the core network type information stored in or in association with the retrieved context.

11. The radio network node of claim 9, the processing circuitry further configured to, before receiving the RRC connection request, release or suspend the RRC connection and store the context for the wireless device in one of multiple different possible storage locations respectively associated with different possible types of core networks selectable by the wireless device, wherein the processing circuitry is configured to attempt to retrieve the context from one or more of the multiple different possible storage locations and to determine said type based on from which possible storage location the context is successfully retrieved.

12. The radio network node of claim 11, the processing circuitry further configured to retrieve multiple candidate contexts that are candidates for being the context for the wireless device, and determine which of the candidate contexts comprises the context for the wireless device based on which of the candidate contexts includes a security token that is verified by the radio network node.

13. The radio network node of claim 9, the processing circuitry configured to attempt to retrieve the context for the wireless device over one or more of multiple different types of interfaces to another radio network node respectively associated with different types of core networks, and to determine said type based on over which type of interface the context is successfully retrieved.

14. The radio network node of claim 9, the processing circuitry further configured to transmit a response to the RRC connection request based on the type of core network determined.

15. The radio network node of claim 9, the processing circuitry configured to receive the RRC connection request without integrity protection and/or confidentiality protection, and to:
- select, based on the type of core network determined, a security algorithm to use to apply integrity protection and/or confidentiality protection to a response to the RRC connection request;
- apply integrity protection and/or confidentiality protection to the response using the selected security algorithm; and
- transmit the response as integrity protected and/or confidentiality protected.

16. The radio network node of claim 9, the processing circuitry configured to receive the RRC connection request on a first type of signaling bearer that uses a first protocol stack, and to:
- select, based on the type of core network determined and from different possible protocol stacks supported by the radio network node, a protocol stack to use for a second type of signaling bearer on which to transmit a response to the RRC connection request; and
- transmit the response to the RRC connection request on the second type of signaling bearer using the selected protocol stack.

* * * * *